(12) United States Patent
Ko et al.

(10) Patent No.: US 8,737,253 B2
(45) Date of Patent: May 27, 2014

(54) METHOD AND APPARATUS FOR TRANSMITTING CHANNEL STATUS INFORMATION EFFICIENTLY IN A MULTI-CARRIER WIRELESS COMMUNICATION SYSTEM

(75) Inventors: Hyun Soo Ko, Anyang-si (KR); Bin Chul Ihm, Anyang-si (KR); Moon Il Lee, Anyang-si (KR); Jae Hoon Chung, Anyang-si (KR); Ja Ho Koo, Anyang-si (KR)

(73) Assignee: LG Electronics Inc., Seoul (KR)

(*) Notice: Subject to any disclaimer, the term of this patent is extended or adjusted under 35 U.S.C. 154(b) by 82 days.

(21) Appl. No.: 13/516,085

(22) PCT Filed: Dec. 17, 2010

(86) PCT No.: PCT/KR2010/009091
§ 371 (c)(1),
(2), (4) Date: Jun. 14, 2012

(87) PCT Pub. No.: WO2011/074923
PCT Pub. Date: Jun. 23, 2011

(65) Prior Publication Data
US 2012/0257531 A1    Oct. 11, 2012

Related U.S. Application Data

(60) Provisional application No. 61/287,211, filed on Dec. 17, 2009.

(30) Foreign Application Priority Data

Dec. 17, 2010   (KR) .......................... 10-2010-0130125

(51) Int. Cl.
*H04W 24/00* (2009.01)
*H04W 72/04* (2009.01)

(52) U.S. Cl.
USPC ............ 370/252; 370/329; 370/328; 370/342

(58) Field of Classification Search
USPC ................. 370/252, 329, 328, 336, 330, 342; 375/260, 316, 222, 259
See application file for complete search history.

(56) References Cited

U.S. PATENT DOCUMENTS 8,358,585 B2 * 1/2013 Chung et al. .................. 370/252
8,457,091 B2 * 6/2013 Pani et al. ..................... 370/342

(Continued)

FOREIGN PATENT DOCUMENTS

KR  10-2005-0091573 A   9/2005
KR  10-2009-0017963 A   2/2009

OTHER PUBLICATIONS

LG Electronics, 'UL control channel design to support carrier aggregation', 3GPP TSG RAN WG1 #56bis R1-091204, Mar. 23-27, 2009, http://ftp.3gpp.org/specs/html-info/TDocExMtg--R1-56b--27331.htm.

*Primary Examiner* — Rasheed Gidado
(74) *Attorney, Agent, or Firm* — McKenna Long & Aldridge LLP

(57) ABSTRACT

The present invention relates to a method for transmitting channel status information in a multi-carrier wireless communication system, according to one embodiment of the present invention, may include: receiving, at a receiving terminal, signals transmitted on N (N≥2) number of carriers from a transmitting terminal to the receiving terminal; determining, at the receiving terminal, channel status information for each of the N number of carriers from the received signals; and transmitting the channel status information for each of the N number of carriers on M (1≤M≤N) number of carriers from the receiving terminal to the transmitting terminal. The channel status information for each of the N number of carriers may be transmitted according to a channel status information reporting period for each of the N number of carriers and a channel status information reporting period offset.

14 Claims, 25 Drawing Sheets

(56) References Cited

U.S. PATENT DOCUMENTS

| | | | |
|---|---|---|---|
| 2009/0245212 A1* | 10/2009 | Sambhwani et al. | 370/336 |
| 2010/0098012 A1* | 4/2010 | Bala et al. | 370/329 |
| 2010/0113078 A1 | 5/2010 | Farajidana et al. | |
| 2010/0118817 A1* | 5/2010 | Damnjanovic et al. | 370/329 |
| 2011/0141926 A1* | 6/2011 | Damnjanovic et al. | 370/252 |

* cited by examiner

FIG. 5
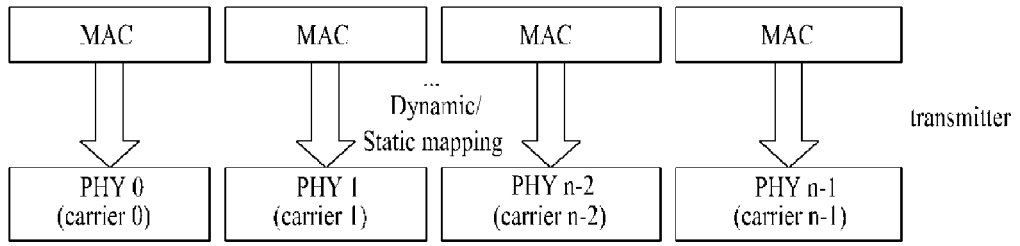
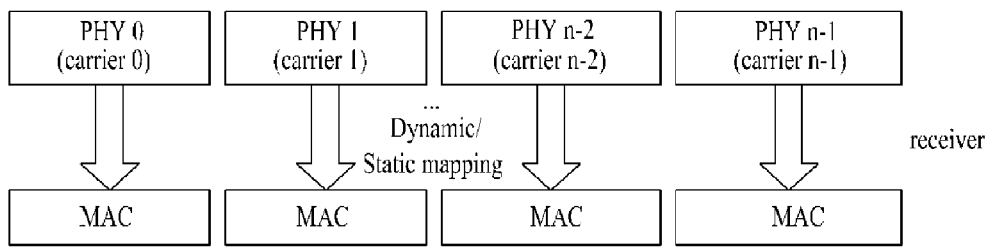
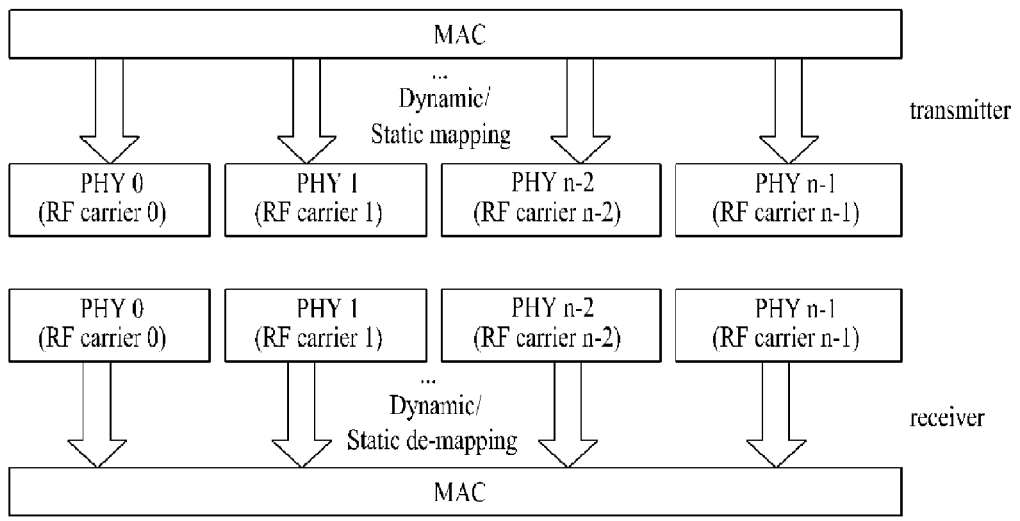

FIG. 9
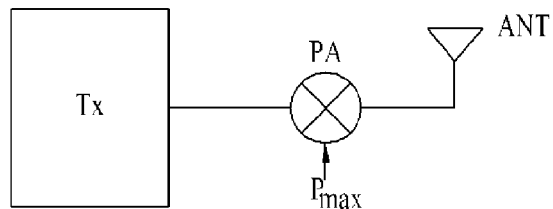
(a)
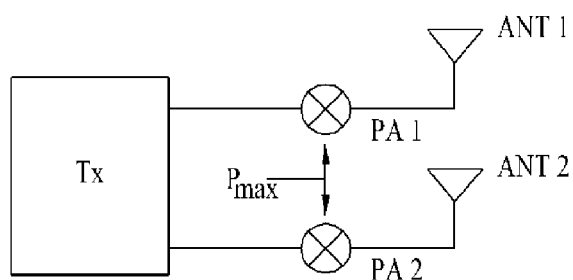
(b)
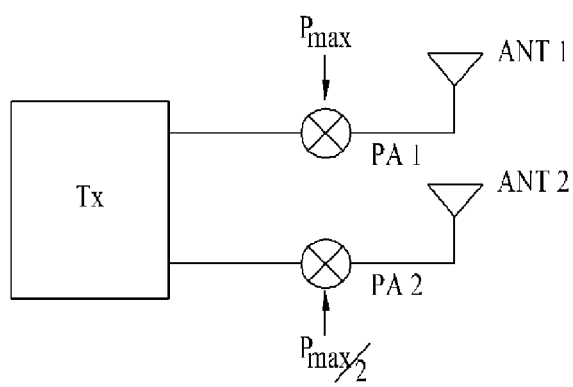
(c)

FIG. 10
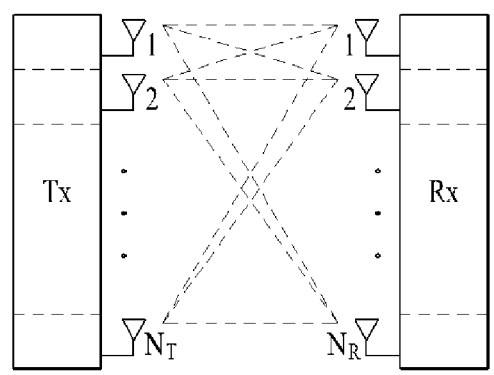
(a)
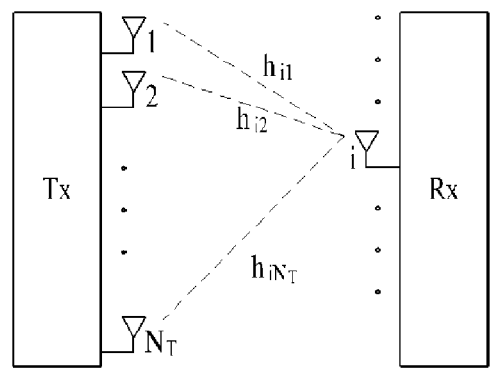
(b)

FIG. 11
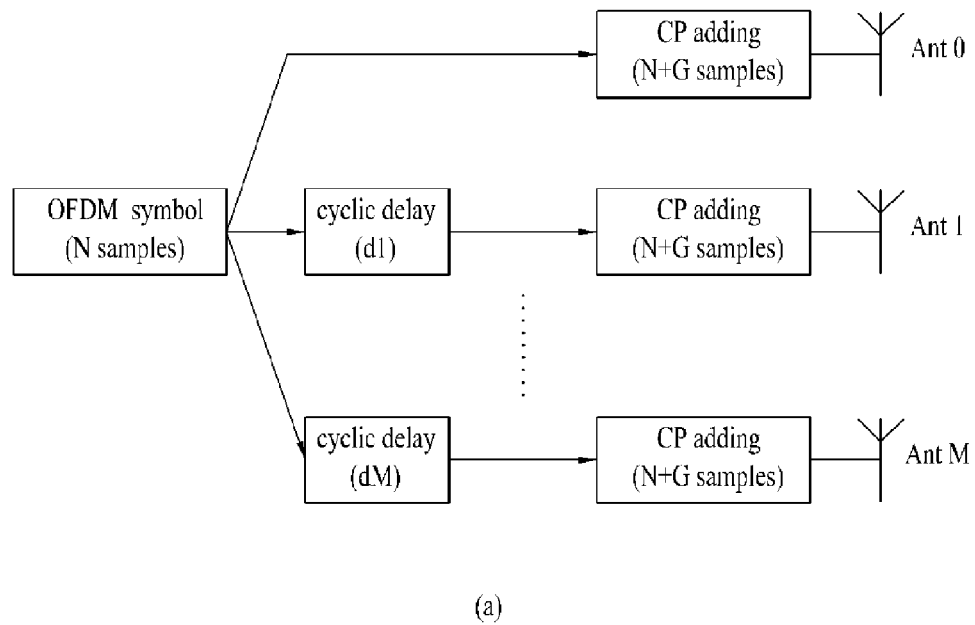
(a)
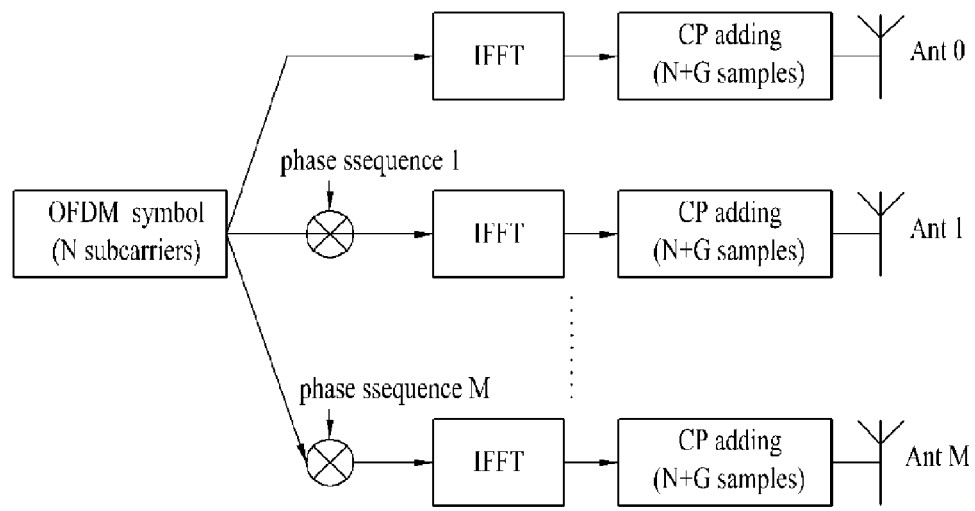
(b)

| | |
|---|---|
| CQI | CQI |
| CQI+A/N | A/N |
| | A/N |
| | |
| DATA ||
| | |

$n_{PRB} = N_{RB}^{UL} - 1$ $n_{PRB} = 0$

| | |
|---|---|
| | |
| DATA ||
| | |
| A/N | |
| A/N | CQI+A/N |
| CQI | CQI | one subframe

FIG. 22

| subframe# | 0 | 1 | 2 | 3 | 4 | 5 | 6 | 7 | 8 |
|---|---|---|---|---|---|---|---|---|---|
| | RI1 | CQI1_1 | | CQI1_2 | | CQI1_3 | | CQI1_4 | |
| | RI2 | | CQI2_1 | | CQI2_2 | | CQI2_3 | | CQI2_4 |

FIG. 23

| subframe# | 0 | 1 | 2 | 3 | 4 | 5 | 6 | 7 |
|---|---|---|---|---|---|---|---|---|
| | CQI1_1 | | CQI1_2 | | CQI1_3 | | CQI1_4 | |
| | | CQI2_1 | | CQI2_2 | | CQI2_3 | | CQI2_4 |

METHOD AND APPARATUS FOR TRANSMITTING CHANNEL STATUS INFORMATION EFFICIENTLY IN A MULTI-CARRIER WIRELESS COMMUNICATION SYSTEM

This application is a 35 U.S.C. §371 National Stage entry of International Application No. PCT/KR2010/009091, filed on Dec. 17, 2010, and claims the benefit of U.S. Provisional Application No. 61/287,211, filed Dec. 17, 2009, and Korean Patent Application No. 10-2010-0130125, filed Dec. 17, 2010, all of which are incorporated by reference in their entirety herein.

TECHNICAL FIELD

The present invention relates to a wireless communication system, and more particularly, to a method and apparatus for efficiently channel status information in a multi-carrier wireless communication system.

BACKGROUND ART

Multiple-input multiple-output (MIMO) technology refer to a method of employing multiple transmit antennas and multiple receive antennas so as to improve transmission/reception data efficiency, unlike a conventional method using one transmit antenna and one receive antenna. That is, the MIMO technology refers to a technology of utilizing multiple antennas in a transmitting end and a receiving end so as to increase capacity and improve performance and may also be referred to as a multi-antenna technology. In order to accurately perform multi-antenna transmission, information about a channel needs to be fed back from a receiving end for receiving a multi-antenna channel.

Although one carrier is configured in uplink and downlink in a conventional wireless communication system, a carrier aggregation technology or a multi-carrier technology using a combination of a plurality of carriers has been introduced in order to support an extended bandwidth.

DISCLOSURE

Technical Problem

As multi-carrier technology has been introduced, a channel information feedback method needs to be defined. In consideration of the fact that uplink control information transmission is performed in restricted time/frequency resources, a time/frequency resource allocation and channel information feedback method needs to be efficiently defined in transmission of channel information of downlink multi-carrier transmission in uplink.

An object of the present invention is to provide an efficient channel information feedback method and apparatus supporting multi-carrier transmission.

The technical problems solved by the present invention are not limited to the above technical problems and other technical problems which are not described herein will become apparent to those skilled in the art from the following description.

Technical Solution

The object of the present invention can be achieved by providing a method of transmitting channel status information in a multi-carrier wireless communication system, the method including, receiving, at a receiver, a signal transmitted on N (N≥2) carriers from a transmitter to the receiver, determining, at the receiver, channel status information of the N carriers based on the received signal, and transmitting, on M (1≤M≤N) carriers from the receiver to the transmitter, the channel status information of the N carriers, wherein the channel status information of the N carriers are transmitted according to respective channel status information reporting periods and channel status information reporting period offsets of the N carriers.

The channel status information of the N carriers may be simultaneously transmitted on the M carriers.

The channel status information of the N carriers may be transmitted through control channels respectively allocated to the M carriers.

The channel status information of the N carriers may be concatenated, encoded and transmitted through one control channel.

The channel status information of the N carriers may be transmitted at different timings.

The channel status information of the N carriers may be sequentially transmitted.

The channel status information of the N carriers may be alternately transmitted.

If the channel status information includes a subband channel quality indicator (CQI), the size of a subband in which the CQI is measured may be a multiple of the size of a subband for one carrier among the N carriers.

If the channel status information includes a rank indicator (RI), RI transmission period offsets of the N carriers may have the same value.

If the channel status information includes a rank indicator (RI), RIs for the N carriers may be transmitted at the same timing.

The respective channel status information reporting period offsets of the N carriers may be determined as offset values relative to a channel status information reporting period offset of a predetermined carrier among the N carriers.

The respective channel status information reporting periods and the channel status information reporting period offsets of the N carriers may be provided through signaling from the transmitter or according to a predetermined rule.

The channel status information of the N carriers may be transmitted through a primary component carrier (PCC) among the M carriers.

The channel status information may include one or more of a channel quality indicator (CQI), a precoding matrix index (PMI) and a rank indicator (RI).

In another aspect of the present invention, there is provided a method of receiving channel status information in a multi-carrier wireless communication system, the method including transmitting a signal on N (N≥2) carriers from a transmitter to a receiver, and receiving, on M (1≤M≤N) carriers from the receiver to the transmitter, channel status information of the N carriers, wherein the channel status information of the N carriers is determined based on the signal transmitted on the N carriers at the receiver, and wherein the channel status information of the N carriers are received according to respective channel status information reporting periods and channel status information reporting period offsets of the N carriers.

In another aspect of the present invention, there is provided a user equipment for transmitting channel status information in a multi-carrier wireless communication system, the user equipment including a reception module configured to receive a downlink signal from a base station, a transmission module configured to transmit an uplink signal to the base station, and a processor configured to control the user equipment including the reception module and the transmission module, wherein the processor receives a downlink signal transmitted on N (N≥2) downlink carriers from the base station through the reception module, determines channel status information of the N downlink carriers based on the received downlink signal, and transmits, on M (1≤M≤N) uplink carriers, the channel status information of the N downlink carriers through the transmission module, and wherein the channel status information of the N downlink carriers is transmitted according to respective channel status information reporting periods and channel status information reporting period offsets of the N downlink carriers.

In another aspect of the present invention, there is provided a base station for receiving channel status information in a multi-carrier wireless communication system, the base station including a reception module configured to receive an uplink signal from a user equipment, a transmission module configured to transmit a downlink signal to the user equipment, and a processor configured to control the base station including the reception module and the transmission module, wherein the processor transmits a downlink signal on N (N≥2) downlink carriers to the user equipment through the transmission module, receives, on M (1≤M≤N) uplink carriers from the user equipment, channel status information of the N downlink carriers from the user equipment through the reception module, wherein the channel status information of the N downlink carriers is determined based on the signal transmitted on the N downlink carriers at the user equipment, and wherein the channel status information of the N downlink carriers are received according to respective channel status information reporting periods and channel status information reporting period offsets of the N downlink carriers.

The above general description and the following detailed description of the present invention are exemplary and are intended to additionally describe the claims.

Advantageous Effects

According to the present invention, it is possible to provide an efficient channel information feedback method and apparatus supporting multi-carrier transmission. According to the present invention, it is possible to reduce overload of channel information feedback and reduce resource waste by efficiently allocating time/frequency resources used for channel information feedback for multi-carrier transmission and efficiently defining a feedback method.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 5 is a diagram showing the configuration of a physical layer (L1) and a medium access control (MAC) layer (L2) of a multi-carrier system.

FIG. 6 is a diagram conceptually illustrating component carriers (CCs) in downlink and uplink.

FIG. 9 is a diagram illustrating maximum transmit power in case of single-antenna transmission and multi-antenna transmission.

FIG. 10 is a diagram showing the configuration of a MIMO communication system.

FIG. 11 is a diagram showing a general CDD structure in a MIMO system.

FIG. 22 is a diagram showing an example of setting an RI reporting offset in a multi-carrier system.

FIG. 23 is a diagram showing an example of setting a CQI reporting period offset in a multi-carrier system.

BEST MODE

Figure 1:
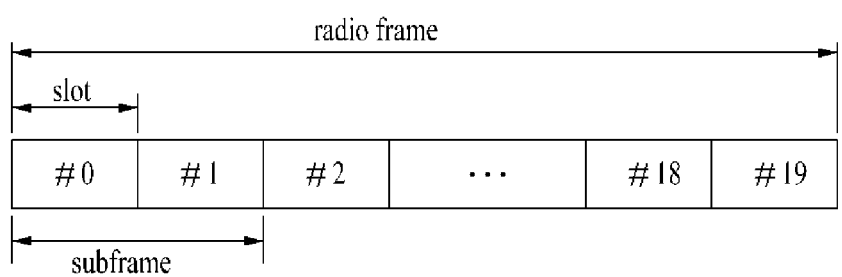
FIG. 1 is a diagram showing the structure of a radio frame used in a $3^{rd}$ Generation Partnership Project Long Term Evolution (3GPP LTE) system.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a user equipment (UE). In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed, for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3$^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A system. However, the technical spirit of the present invention is not limited thereto.

FIG. 1 is a diagram showing the structure of a radio frame used in a 3$^{rd}$ Generation Partnership Project Long Term Evolution (3GPP LTE) system. One downlink frame includes 10 subframes, and one subframe includes two slots in a time domain. A time required for transmitting one subframe is referred to as a Transmission Time Interval (TTI): For example, one subframe may have a length of 1 ms and one slot may have a length of 0.5 ms. One slot may include a plurality of OFDM symbols in a time domain. In the 3GPP LTE system, since an OFDMA scheme is used in downlink, the OFDM symbol indicates one symbol period. One symbol may be called an SC-FDMA symbol or symbol period in uplink. A resource block (RB) is a resource allocation unit and includes a plurality of contiguous subcarriers in one slot. The structure of the radio frame is only exemplary. Accordingly, the number of subframes included in the radio frame, the number of slots included in the subframe or the number of OFDM symbols included in the slot may be changed in various manners.

Figure 2:
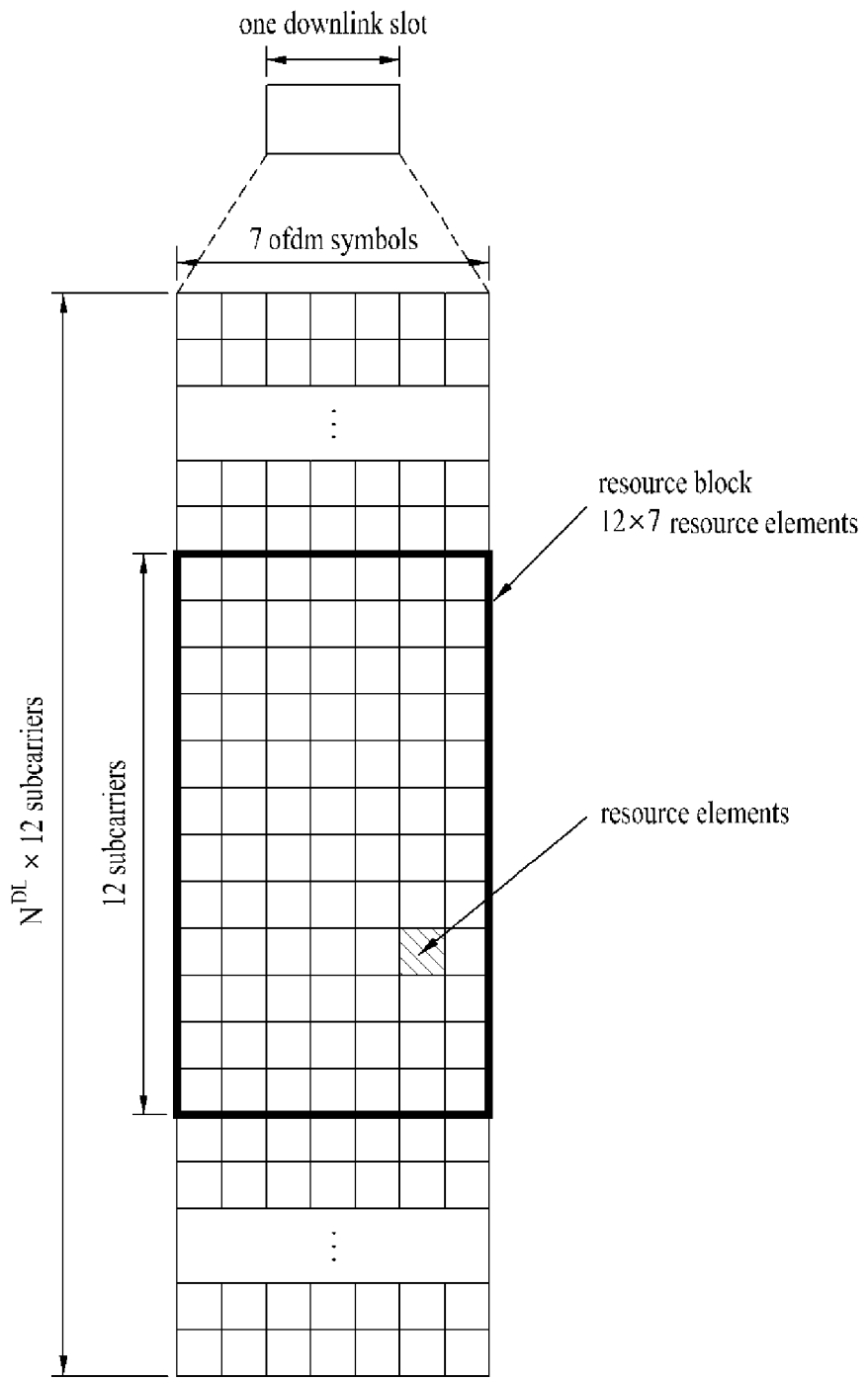
FIG. 2 is a diagram showing a resource grid of a downlink slot.

FIG. 2 is a diagram showing a resource grid of a downlink slot. One downlink slot includes seven OFDM symbols in a time domain and one RB includes 12 subcarriers in a frequency domain, to which the present invention is not limited. For example, one slot includes seven OFDM symbols in a normal cyclic prefix (CP) and one slot includes six OFDM symbols in an extended CP. Each element of the resource grid is referred to as a Resource Element (RE). One RB includes 12×7 REs. The number $N^{DL}$ of RBs included in the downlink slot is determined based on downlink transmission bandwidth. The structure of an uplink slot may be equal to that of the downlink slot.

Figure 3:
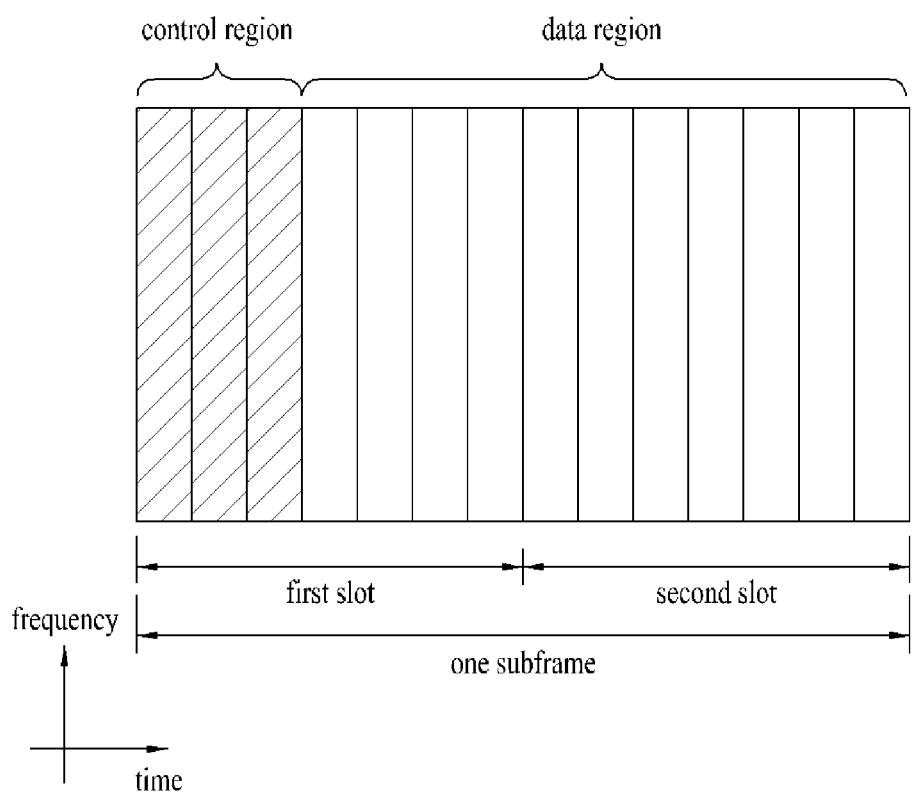
FIG. 3 is a diagram showing the structure of a downlink subframe.

FIG. 3 is a diagram showing the structure of a downlink subframe. A maximum of three OFDM symbols of a front portion of a first slot within one subframe corresponds to a control region to which control channels are allocated. The remaining OFDM symbols correspond to a data region to which Physical Downlink Shared Channels (PDSCHs) are allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for an individual UEs in a certain UE group, transmit power control information, activation of Voice over IP (VoIP), etc. A plurality of PDCCHs may be transmitted within the control region.

A UE may monitor the plurality of PDCCHs. The PDCCHs are transmitted on an aggregation of one or several consecutive control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the terminal, and attaches a Cyclic Redundancy Check (CRC) to control information. The CRC is masked with a Radio Network Temporary Identifier (RNTI) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the terminal, a random access-RNTI (RA-RNTI) may be masked to the CRC.

Figure 4:
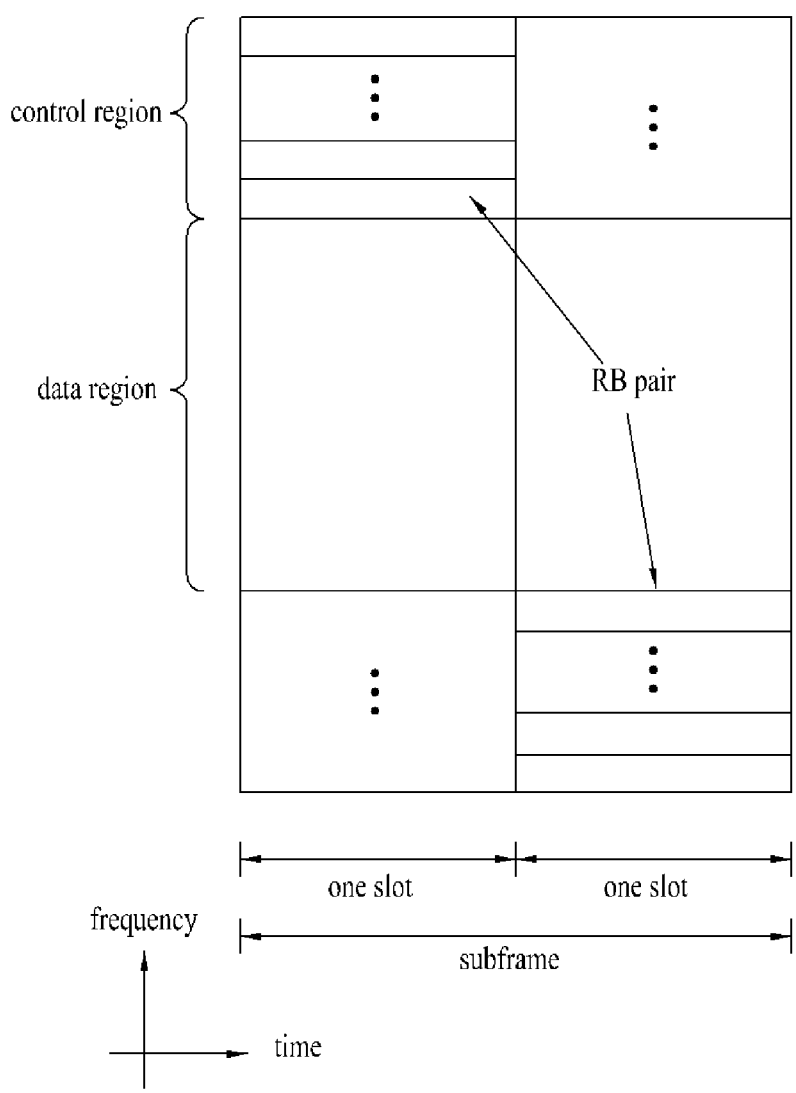
FIG. 4 is a diagram showing the structure of an uplink subframe.

FIG. 4 is a diagram showing the structure of an uplink subframe. The uplink subframe may be divided into a control region and a data region in a frequency domain. A Physical Uplink Control Channel (PUCCH) including uplink control information is allocated to the control region. A Physical uplink Shared Channel (PUSCH) including user data is allocated to the data region. In order to maintain single carrier characteristics, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot edge.

Carrier Aggregation

In a general wireless communication system, only one carrier is mainly considered even when the bandwidths of the uplink and the downlink may be differently set. For example, a wireless communication system in which the number of carriers configuring the uplink or the downlink is 1 and the bandwidth of the uplink and the bandwidth of the downlink are generally symmetrical with respect to each other may be provided based on a single carrier.

International Telecommunication Union (ITU) has requested candidate technologies of the IMT-Advanced to support an extended bandwidth, as compared with the existing radio communication system. However, it is difficult to allocate a frequency having a large bandwidth in the whole world excluding some regions. Accordingly, as technologies of efficiently using a plurality of small bands, carrier aggregation, bandwidth aggregation or spectrum aggregation technologies of physically aggregating a plurality of bands in a frequency domain so as to logically obtain the same effect as the use of a large band have been developed.

The carrier aggregation technology is introduced in order to increase throughput, to prevent cost increase due to introduction of a wideband RF element, and to guarantee compatibility with the existing system. The carrier aggregation technology refers to technology of exchanging data between a UE and a BS by aggregating a plurality of carriers in a bandwidth unit defined in the existing radio communication system (e.g., a 3GPP LTE Release 8 or 9 in case of a 3GPP LTE-A system). A carrier of the bandwidth unit defined in the existing radio communication system may be called a Component Carrier (CC). Carrier aggregation technology using one or more CCs may be applied to the uplink and the downlink. For example, the carrier aggregation technology may include technology of supporting a maximum system bandwidth of 100 MHz by aggregating a maximum of five CCs even when one CC supports a bandwidth of 5 MHz, 10 MHz or 20 MHz.

A downlink CC may be expressed by a DL CC and an uplink CC may be expressed by a UL CC. The carrier or CC may be expressed by a cell according to the method of describing the function in the 3GPP standard. Thus, the DL CC may be expressed by a DL cell and a UL CC may be referred to as a UL cell. Hereinafter, in the present invention, a plurality of carriers to which carrier aggregation is applied may be expressed by the term "carrier", "component carrier", "CC" or "cell".

Although the case in which a downlink transmitter is a base station (cell) and an uplink transmitter is a UE is mainly described in the following description, the present invention is not limited thereto. That is, the present invention is applicable to the case in which a relay node is a downlink transmitter to a UE or is an uplink receiver from a UE or the case in which a relay node is an uplink transmitter to a BS or a downlink receiver from a BS.

Downlink carrier aggregation describes in which time domain resources (in subframe units) downlink transmission from a BS to a UE is supported using frequency domain resources (subcarriers or physical resource blocks (PRBs)) on one or more carrier bands. Uplink carrier aggregation describes in which time domain resources (in subframe units) uplink transmission from a UE to a BS is supported using frequency domain resources (subcarriers or PRBs) on one or more carrier bands.

Referring to FIG. 5, the configuration of a physical layer (first layer, L1) and a medium access control (MAC) layer (second layer, L2) of a multi-carrier system will be described. In a BS of a conventional single-carrier wireless communication system, one physical layer (PHY) supporting one carrier may be present and one MAC layer controlling one PHY layer may be provided. In the PHY layer, for example, a baseband processing operation may be performed. In the MAC layer, for example, an L1/L2 scheduler operation including a MAC/RLC sublayer and generation of a MAC protocol data unit (PDU) may be performed in a transmitter. A MAC PDU packet block of the MAC layer is converted into a transport block via a logical transport layer and is mapped to a physical layer input information block. The MAC layer of this figure is expressed by the whole L2 layer to include MAC/RLC/PDCP sublayers, which is applicable to the description of the MAC layer of the present invention.

In a multi-carrier system, a plurality of PHY and MAC layers may be provided. That is, as shown in FIG. 5(a), a transmitter and a receiver of the multi-carrier system may be configured such that one PHY layer and one MAC layer correspond to each other with respect to n component carriers. Since the PHY layers and MAC layers are configured on a per component carrier basis, a PDSCH is generated from the MAC PDU in the PHY layer on a per component carrier basis.

Alternatively, in a multi-carrier system, one common MAC layer and a plurality of PHY layers may be configured. That is, as shown in FIG. 5(b), a transmitter and a receiver of a multi-carrier system may be configured such that n PHY layers respectively corresponding to n component carriers are provided and one common MAC layer for controlling the n PHY layers is provided. In this case, the MAC PDU from one MAC layer may be divided into a plurality of transport blocks respectively corresponding to the plurality of component carriers on a transport layer. Alternatively, when generating a MAC PDU in the MAC layer and generating an RLC PDU in the RLC layer, the MAC PDU may be divided on a per component carrier basis. Accordingly, in the PHY layer, a PDSCH is generated on a per component carrier basis.

A PDCCH for transmitting control information of L1/L2 control signaling generated by a packet scheduler of the MAC layer may be mapped to physical resources of an individual component carrier so as to be transmitted. A PDCCH including control information (downlink allocation or uplink grant) for PDSCH or PUSCH transmission to a specific UE may be encoded according to component carrier on which the PDSCH/PUSCH is transmitted. Such a PDCCH may be referred to as a separate-coded PDCCH. Control information for PDSCH/PUSCH transmission of a plurality of component carriers may be configured as one PDCCH and transmitted. This PDCCH may be referred to as a joint-coded PDCCH.

In order to support carrier aggregation, a link between a BS and a UE (or a relay node) needs to be established such that a control channel (PDCCH or PUCCH) and/or a shared channel (PDSCH or PUSCH) are transmitted. Measurement and/or reporting of a carrier are necessary for a link of each specific UE (or relay node) and component carriers to be measured and/or reported may be assigned. That is, component carrier assignment involves configuration of component carriers (specify the number of component carriers and indexes) used for downlink/uplink transmission among downlink/uplink component carriers configured in a BS, in consideration of capabilities of a specific UE (or a relay node) and a system environment.

At this time, if a third layer (L3) (radio resource management (RRM) layer) controls component carrier assignment, UE-specific or RN-specific RRC signaling may be used. Alternatively, cell-specific or cell cluster-specific RRC signaling may be used. If dynamic control such as activation/deactivation of a series of component carriers is necessary for component carrier assignment, a predetermined PDCCH, a component carrier assignment control information-dedicated physical control channel or a PDSCH of an L2 MAC message format may be used as L1/L2 control signaling. If component carrier assignment is controlled by a packet scheduler, a predetermined PDCCH, a component carrier assignment control information-dedicated physical control channel or a PDSCH of an L2 MAC message format may be used as L1/L2 control signaling.

FIG. 6 is a diagram conceptually illustrating component carriers (CCs) in downlink and uplink. DL CCs and UL CCs of FIG. 6 may be allocated to a BS (cell) or a relay node (RN). The number of DL CCs may be set to N and the number of UL CCs may be set to M.

After performing a step of establishing RRC connection based on an arbitrary CC with respect to DL and UL through an initial access or initial deployment process (a process including a cell search process, a process of acquiring/receiving system information and an initial random access process), a UE may receive a UE-specific carrier from a BS through dedicated signaling (UE-specific RRC signaling or UE-specific L1/L2 PDCCH signaling). Alternatively, if carriers of UEs are commonly configured in units of BSs (cells or cell clusters), the carriers may be provided through cell-specific RRC signaling or cell-specific UE-common L1/L2 PDCCH signaling. Alternatively, carrier configuration information of a BS may be signaled to a UE through system information for establishing RRC connection or through separate system information or cell-specific RRC signaling after establishing RRC connection.

Although a DL/UL CC configuration is described based on a relationship, between a BS and a UE in the present document, the present invention is not limited thereto. For example, the present invention is equally applicable to the case in which an RN provides a DL/UL CC configuration to a UE within an RN region and is equally applicable to the case in which a BS provides a DL/UL CC configuration to an RN within a BS region. Hereinafter, for clarity, although a DL/UL CC configuration will be described based on a relationship between a BS and a UE, the same DL/UL CC configuration is applicable to a relationship between an RN and a UE (access uplink and downlink) or a relationship between a BS and an RN (backhaul uplink and downlink).

In a process of uniquely assigning DL/UL CCs to an individual UE, DL/UL CC linkage may be set implicitly or explicitly through definition of an arbitrary signaling parameter.

Figure 7:
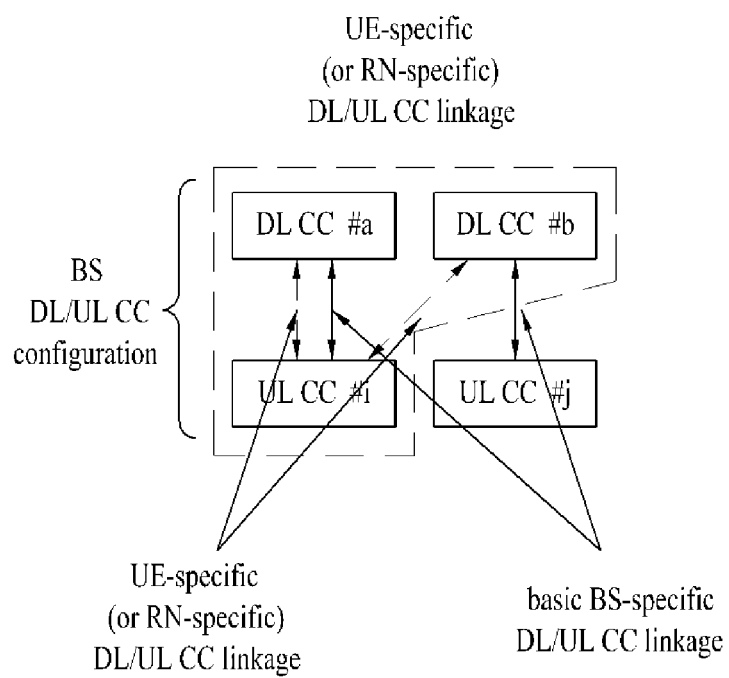
FIG. 7 is a diagram illustrating an example of DL/UL CC linkage.

FIG. 7 is a diagram illustrating an example of a DL/UL CC linkage. In the case in which a BS configures two downlink CCs (DL CC #a and DL CC #b) and two uplink CCs (UL CC #i and UL CC #j), DL/UL CC linkage defined as two DL CCs (DL CC #a and DL CC #b) and one UL CC (UL CC #i) are assigned to an arbitrary UE is shown. In the DL/UL CC linkage of FIG. 7, a solid line denotes linkage between a DL CC and a UL CC configured by the BS, which may be defined in SIB 2. In the DL/UL CC linkage of FIG. 7, a dotted line denotes linkage between a DL CC and a UL CC established with respect to a specific UE. The linkage between the DL CC and the UL CC of FIG. 7 is merely exemplary and the present invention is not limited thereto. That is, in the various embodiments of the present invention, the number of DL CCs and UL CCs configured by the BS may be set to an arbitrary value. Thus, the number of DL CCs and UL CCs which may be UE-specifically configured or assigned may be set to an arbitrary value within the configured DL CCs and UL CCs and the DL/UL CC linkage may be defined using a method different from FIG. 7.

For a series of particular purposes, a primary CC (PCC) (or a primary cell (P-cell)) or an anchor CC (or an anchor cell) may be set among DL and UL CCs configured with respect to an arbitrary UE. For example, for the purpose of transmitting configuration/reconfiguration information on RRC connection establishment, a DL PCC (or a DL P-cell) may be set. As another example, a UL CC for transmitting a PUCCH for transmitting UCI which should be transmitted by an arbitrary UE in uplink may be set as a UL PCC (or a UL P-cell). One DL PCC (P-cell) and one UL PCC (P-cell) are set with respect to each UE. Alternatively, if many CCs are set with respect to a UE or if CCs are received from a plurality of BSs, one or more BSs may set one or a plurality of DL PCCs (P-cells) and/or UL PCCs (P-cells) with respect to an arbitrary UE. A method of arbitrarily configuring linkage between a DL PCC (P-cell) and a UL PCC (P-cell) at a BS on a UE-specific basis may be considered. As a simplified method, linkage between a DL PCC (P-cell) and a UL PCC (P-cell) may be configured based on a basic linkage relationship predefined in the LTE release-8 (Rel-8) and signaled through System Information Block (SIB) (or Base) 2. The linked DL PCC (P-cell) and UL PCC (P-cell) may be combined so as to be expressed as a UE-specific P-cell.

SC-FDMA Transmission and OFDMA Transmission

Figure 8:
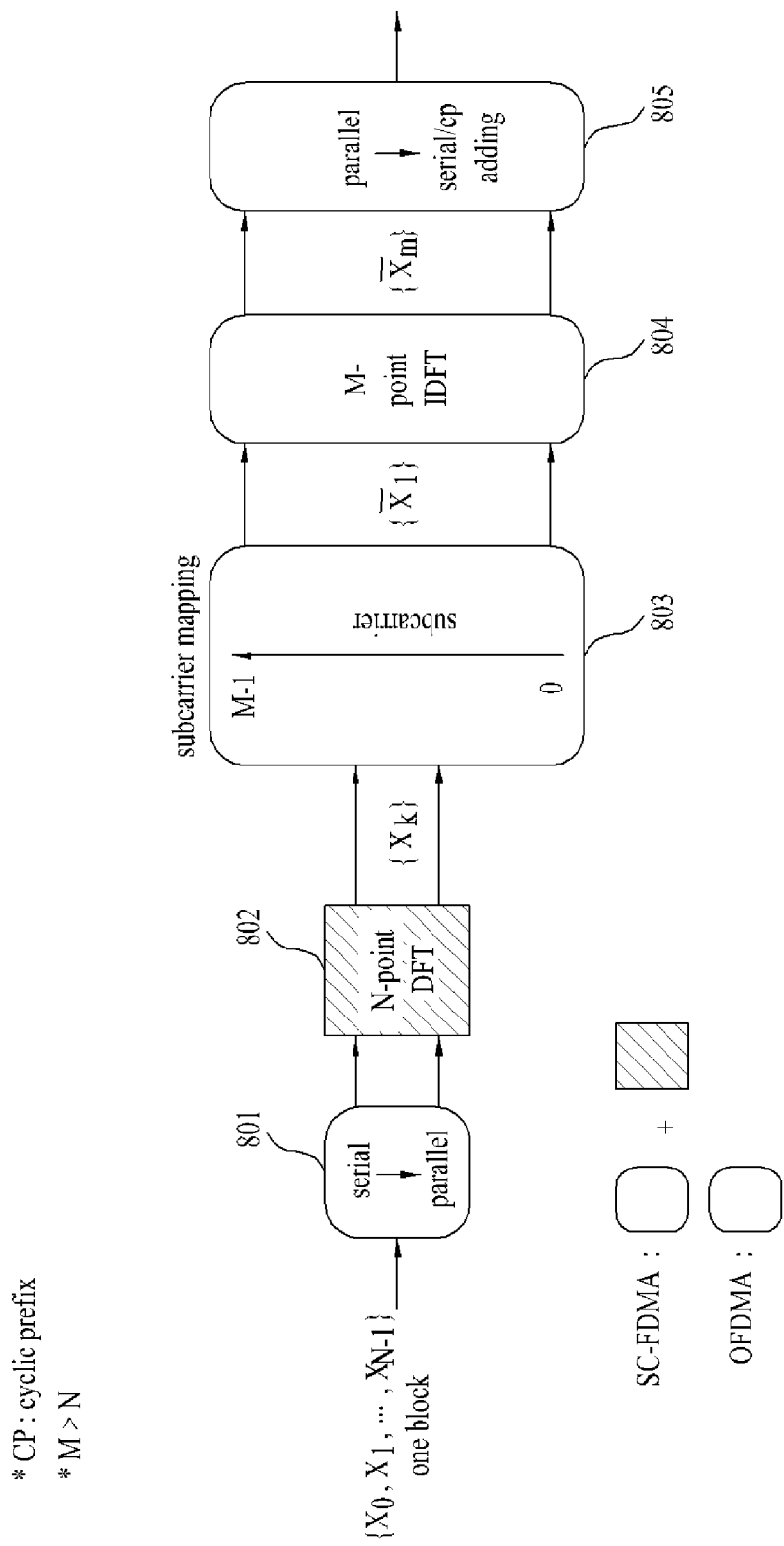
FIG. 8 is a diagram illustrating a Single Carrier Frequency Division Multiple Access (SC-FDMA) transmission method and an Orthogonal Frequency Division Multiple Access (OFDMA) transmission method.

FIG. 8 is a diagram illustrating a Single Carrier Frequency Division Multiple Access (SC-FDMA) transmission method and an Orthogonal Frequency Division Multiple Access (OFDMA) transmission method in a mobile communication system. The SC-FDMA transmission, method may be used for uplink transmission and the OFDMA transmission method may be used for downlink transmission.

An uplink signal transmitter (e.g., a UE) and a downlink signal transmitter (e.g., a BS) are identical in that a serial-to-parallel converter 801, a subcarrier mapper 803, an M-point Inverse Discrete Fourier Transform (IDFT) (or IFFT) module 804 and a parallel-to-serial converter 805 are included. An input signal input to the serial-to-parallel converter 801 is a channel-coded and modulated data symbol. The UE for transmitting a signal using an SC-FDMA scheme further includes an N-point DFT module 802 so as to partially offset an IDFT (or IFFT) processing influence of the M-point IDFT (or IFFT) module 804 such that the transmitted signal has a single carrier property. That is, the DFT module 802 performs DFT spreading with respect to the input data symbol so as to satisfy a single carrier property required for uplink transmission. Such an SC-FDMA transmission method provides a good peak to average power ratio (PAPR) or a cubic metric (CM) such that more efficient transmission is possible even when the power of an uplink transmitter is restricted. Thus, it is possible to improve user throughput.

FIG. 9 is a diagram illustrating maximum transmit power in case of single-antenna transmission and multi-antenna transmission. FIG. 9(*a*) shows single-antenna transmission. One power amplifier (PA) may be provided to one antenna. In FIG. 9(*a*), the output $P_{max}$ of the PA may have a specific value, for example, 23 dBm. FIGS. 9(*b*) and 9(*c*) show multi-antenna transmission. In FIGS. 9(*b*) and 9(*c*), a plurality of PAs may be mapped to a plurality of transmit antennas, respectively. For example, if the number of transmit antennas is 2, two PAs are mapped to transmit antennas. The output values (that is, maximum transmit power) of the two PAs may be differently set as shown in FIGS. 9(*b*) and 9(*c*).

In FIG. 9(*b*), an example of dividing and applying a maximum transmit power value $P_{max}$ to PA1 and PA2 in case of single-antenna transmission is shown. That is, if the transmit power value of x dBm is set with respect to PA1, the transmit power value of $(P_{max}-x)$ dBm is applied to PA2. In this case, since the total transmit power is maintained at $P_{max}$, the transmitter may have a strong property even when the PAPR is increased in a state in which power is restricted.

FIG. 9(*c*) shows an example in which only one transmit antenna ANT1 has a maximum transmit power value $P_{max}$ and the transmit power value of the other transmit antenna ANT2 is $P_{max}/2$ which is half the maximum transmit power value. In this case, only one transmit antenna may have a strong property even when the PAPR is increased.

MIMO System

In the MIMO technique, a single antenna path is not used for receiving one message. Instead, in the MIMO technique, data fragments received via several antennas are collected and combined so as to complete data. Since the MIMO technique improves a data transfer rate in a specific range or increases system coverage with respect to a specific data transfer rate, this technique is a next-generation mobile communication technique which may be used in mobile communication terminals and relay nodes. The MIMO technique is attracting attention as a next-generation technique for overcoming a limit in transmission amount due to increase in data traffic.

FIG. 10(*a*) is a diagram showing the configuration of a general MIMO communication system. As shown in FIG. 10(*a*), if the number of transmit antennas is increased to $N_T$ and, at the same time, the number of receive antennas is increased to $N_R$, theoretical channel transmission capacity is increased as compared with the case where multiple antennas are used in only one of the transmitter or the receiver. Accordingly, a transmission rate is improved and frequency efficiency is remarkably improved. A transmission rate due to increase in channel transmission capacity can be theoretically increased by a value obtained by multiplying a maximum transmission rate Ro when one antenna is used by an increase ratio $R_i$ shown in Equation 1.

$$R_i = \min(N_T, N_R) \qquad \text{Equation 1}$$

For example, in a MIMO system using four transmit antennas and four receive antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. As shown in FIG. 10(*a*), it is assumed that $N_T$ transmit antennas and $N_R$ receive antennas are present. In transmitted signals, if the $N_T$ transmit antennas are present, the number of pieces of maximally transmittable information is $N_T$. The transmitted information may be expressed by a vector shown in Equation 2.

$$s = [s_1, s_2, \ldots, s_{N_T}]^T \qquad \text{Equation 2}$$

The transmitted information $S_1, S_2, \ldots, S_{N_T}$ may have different transmit powers. If the respective transmit powers are $P_1, P_2, \ldots, P_{N_T}$, the transmitted information with adjusted powers may be expressed by a vector shown in Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{Equation 3}$$

In addition, $\hat{S}$ may be expressed using a diagonal matrix P of the transmit powers as shown in Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{Equation 4}$$

Considers that the $N_T$ actually transmitted signals $x_1, x_2, \ldots, x_{N_T}$ are configured by applying a weight matrix W to the information vector $\hat{S}$ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector X as shown in Equation 5. $W_{ij}$ denotes a weight between an i-th transmit antenna and j-th information. W is also called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{Equation 5}$$

If the $N_R$ receive antennas are present, respective received signals $y_1, y_2, \ldots, y_{N_R}$ antennas are expressed as shown in Equation 6

$$y = [y_1, y_2, \ldots, y_{N_R}]^T \quad \text{Equation 6}$$

If channels are modeled in the MIMO communication system, the channels may be distinguished according to transmission/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

Several channels may be combined and expressed in the form of a vector and a matrix. The vector will now be described. FIG. 10(b) is a diagram showing channels from the $N_T$ transmit antennas to the receive antenna i.

As shown in FIG. 10(b), the channels from the $N_T$ transmit antennas to the receive antenna i may be expressed as follows.

$$h_i^T = [h_{i1}, h_{i2}, \ldots, h_{iN_T}] \quad \text{Equation 7}$$

Accordingly, through the matrix of Equation 7, all the channels from the $N_T$ transmit antennas to the $N_R$ receive antennas may be expressed as shown in Equation 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \quad \text{Equation 8}$$

An Additive White Gaussian Noise (AWGN) is added to the actual channels after a channel matrix H. The AWGN $n_1, n_2, \ldots, n_{N_R}$ added to the $N_R$ receive antennas may be expressed as shown in Equation 9.

$$n = [n_1, n_2, \ldots, n_{N_R}]^T \quad \text{Equation 9}$$

Through the above-described mathematical modeling, the received signals may be expressed as shown in Equation 10.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{Equation 10}$$

The number of rows and columns of the channel matrix H indicating the channel status is determined by the number of transmit and receive antennas. The number of rows of the channel matrix H is equal to the number $N_R$ of receive antennas and the number of columns thereof is equal to the number $N_T$ of transmit antennas. That is, the channel matrix H may be expressed by an $N_R \times N_T$ matrix. In general, the rank of the matrix is defined by the smaller of the number of rows or columns, which is independent from each other. Accordingly, the rank of the matrix is not greater than the number of rows or columns. The rank of the channel matrix H may be expressed by Equation 11.

$$\text{rank}(H) \leq \min(N_T, N_R) \quad \text{Equation 11}$$

The MIMO transmission/reception scheme used for the operation of the MIMO system may include a Frequency Switched Transmit Diversity (FSTD) scheme, a Space Frequency Block Code (SFBC) scheme, a Space Time Block Code (STBC) scheme, a Cyclic Delay Diversity (CDD) scheme, a Time Switched Transmit Diversity (TSTD) scheme, etc. In rank of 2 or more, a Spatial Multiplexing (SM) scheme, a Generalized Cyclic Delay Diversity (GCDD) scheme, a Selective Virtual Antenna Permutation (S-VAP), etc. may be used.

The FSTD scheme is to allocate subcarriers having different frequencies to signals transmitted through multiple antennas so as to obtain diversity gain. The SFBC scheme is to efficiently apply selectivity of a spatial region and a frequency region so as to obtain diversity gain and multiuser scheduling gain. The STBC scheme is to apply selectivity of a spatial domain and a time region. The CDD scheme is to obtain diversity gain using path delay between transmission antennas. The TSTD scheme is to temporally divide signals transmitted through multiple antennas. The spatial multiplexing scheme is to transmit different data through antennas so as to increase a transfer rate. The GCDD scheme is to apply selectivity of a time region and a frequency region. The S-VAP scheme uses a single precoding matrix and includes a Multi Codeword (MCW) S-VAP for mixing multiple codewords among antennas in spatial diversity or spatial multiplexing and a Single Codeword (SCW) S-VAP using a single codeword.

Among the above-described MIMO transmission schemes, the STBC scheme is to repeat the same data symbol in a method supporting orthogonality in the time domain so as to acquire time diversity. Similarly, the SFBC is to repeat the same data symbol in a method supporting orthogonality in the frequency domain so as to acquire frequency diversity. Examples of the time frequency code used for the STBC scheme and the frequency block code used for the SFBC scheme are shown in Equations 12 and 13. Equation 12 shows a block code in case of two transmit antennas and Equation 13 shows a block code in case of four transmit antennas.

$$\frac{1}{\sqrt{2}} \begin{pmatrix} S_1 & S_2 \\ -S_2^* & S_1^* \end{pmatrix} \quad \text{Equation 12}$$

$$\frac{1}{\sqrt{2}} \begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \quad \text{Equation 13}$$

In Equations 12 and 13, $s_i$ (i=1, 2, 3, 4) denotes a modulated data symbol. In addition, the row of the matrix of Equation 12 or 13 denotes an antenna port and the column thereof denotes time (in case of STBC) or frequency (in case of SFBC).

Among the above-described MIMO transmission schemes, the CDD scheme involves artificially increasing delay spreading so as to increase frequency diversity. FIG. 11 is a diagram showing a general CDD structure in a MIMO system. FIG. 11(a) shows a method of applying cyclic delay in a time domain. The CDD scheme of applying cyclic delay of FIG. 11(a) may be implemented by applying phase-shift diversity as shown in FIG. 11(b).

Figure 12:
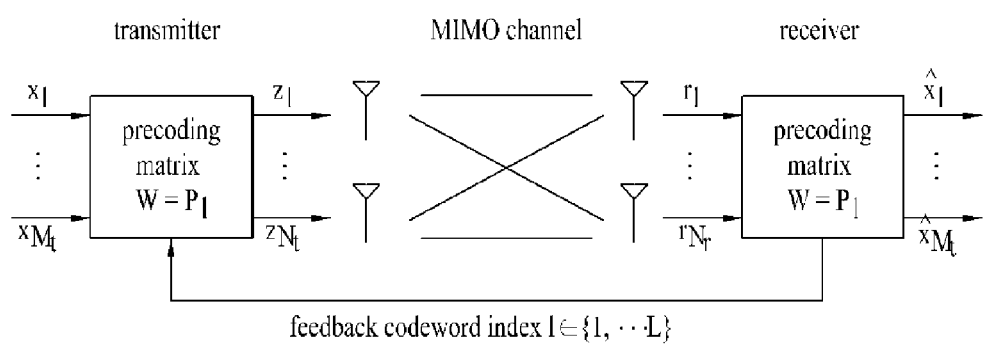
FIG. 12 is a diagram illustrating codebook based precoding.

In association with the above-described MIMO transmission schemes, a codebook based precoding scheme will be described. FIG. 12 is a diagram illustrating the basic concept of codebook based precoding.

According to the codebook based precoding scheme, a transmitting end and a receiving end share codebook information including a predetermined number of precoding matrices predefined according to transmission rank, number of antennas, etc. That is, if feedback information is finite, a precoding based codebook method may be used. The receiving end may measure a channel status through a received signal and feed preferred precoding matrix information back to the transmitting end based on the codebook information. For example, the receiving end may measure a received signal and select a best precoding matrix using a maximum likelihood (ML) or a minimum mean square error (MMS) method. Although FIG. 12 shows the case where the receiving end transmits the preferred precoding matrix information to the transmitting end on a codeword-by-codeword basis, the present invention is not limited thereto.

The transmitting end which receives the feedback information from the receiving end may select a specific precoding matrix from the codebook based on the received information. The transmitting end which selects the precoding matrix may perform precoding by multiplying layer signals corresponding in number to the number of transmission ranks by the precoding matrix and transmit the signal subjected to precoding via a plurality of antennas.

The receiving end which receives the signal precoded and transmitted by the transmitting end may perform inverse processing of the precoding performed by the transmitting end so as to restore the received signal. In general, since the precoding matrix satisfies the condition of a unitary matrix U such as $U*U^H=I$, inverse processing of precoding may be performed by multiplying a Hermitian matrix $P^H$ of the precoding matrix P used for precoding of the transmitting end by the received signal.

PUCCH

A PUCCH including uplink control information will be described.

Control information of a plurality of UEs may be transmitted via the PUCCH and, if code division multiplexing (CDM) is performed in order to distinguish between signals of the UEs, a Constant Amplitude Zero Autocorrelation (CAZAC) sequence having a length of 12 is mainly used. Since the CAZAC sequence has a property that a constant amplitude is maintained in a time domain and a frequency domain, a peak-to-average power ratio (PAPR) or cubic metric (CM) of a UE is lowered to increase coverage. In addition, ACK/NACK information of downlink data transmission transmitted via a PUCCH is covered using an orthogonal sequence.

Control information transmitted on a PUCCH may be distinguished using cyclically shifted sequences having different cyclic shift values. The cyclically shifted sequence may be generated by cyclically shifting a base sequence by a specific cyclic shift (CS) amount. The specific CS amount is indicated by a CS index. The number of available CSs may be changed according to delay spread of a channel. Various types of sequences may be used as a base sequence and the above-described CAZAC sequence is an example of the base sequence.

The PUCCH may include control information such as a scheduling request (SR), downlink channel measurement information and ACK/NACK of downlink data transmission. The channel measurement information may include a channel quality indicator (CQI), a precoding matrix index (PMI) and a rank indicator (RI).

A PUCCH format is defined according to the type of control information included in the PUCCH, a modulation scheme, etc. That is, PUCCH format 1 is used to transmit an SR, PUCCH format 1a or format 1b is used to transmit ACK/NACK, PUCCH format 2 is used to transmit a CQI, and PUCCH format 2a/2b is used to transmit a CQI and HARQ ACK/NACK.

If HARQ ACK/NACK is transmitted alone in an arbitrary subframe, PUCCH format 1a or format 1b is used and, if an SR is transmitted alone, PUCCH format 1 is used. A UE may transmit HARQ ACK/NACK and an SR in the same subframe, which will be described below.

The PUCCH format is summarized as shown in Table 1.

TABLE 1

| PUCCH format | Modulation scheme | Number of bits per subframe | Usage | etc. |
| --- | --- | --- | --- | --- |
| 1 | N/A | N/A | SR (Schedulina Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI + ACK/NACK | Normal CP only |
| 2b | QPSK + BPSK | 22 | CQI + ACK/NACK | Normal CP only |

Figure 13:
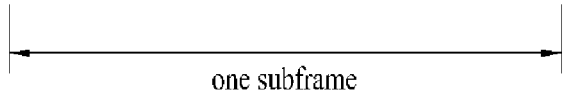
FIG. 13 is a diagram showing a resource mapping structure of a physical uplink control channel (PUCCH).

FIG. 13 shows a resource mapping structure of a PUCCH in an uplink physical resource block. $N_{RB}^{UL}$ denotes the number of RBs in uplink and $n_{PRB}$ denotes a physical resource block number. The PUCCH is mapped to both edges of an uplink frequency block. CQI resources may be mapped to a physical RB just next to an edge of a frequency band and ACK/NACK may be mapped to a physical RB next to the physical RB to which the CQI resources are mapped.

PUCCH format 1 is for a control channel used for SR transmission. The SR may be transmitted such that a UE requests scheduling or does not request scheduling.

PUCCH format 1a/1b is for a control channel used for ACK/NACK transmission. In PUCCH format 1a/1b, a symbol modulated using a BPSK or QPSK modulation scheme is multiplied by a CAZAC sequence having a length of 12. After multiplying the symbol by the CAZAC sequence, the symbol is block-wisely spread to an orthogonal sequence. A Hadamard sequence having a length of 4 may be used with respect to general ACK/NACK information and a Discrete Fourier Transform (DFT) sequence having a length of 3 may be used with respect to shortened ACK/NACK information. In case of the extended CP, a Hadamard sequence having a length of 2 may be used with respect to an RS.

A UE may transmit HARQ ACK/NACK and an SR in the same subframe. For positive SR transmission, a UE may transmit HARQ ACK/NACK through resources allocated to an SR. For negative SR transmission, a UE may transmit HARQ ACK/NACK through resources allocated to ACK/NACK.

Next, PUCCH format 2/2a/2b will be described. PUCCH format 2/2a/2b is for a control channel for transmitting channel measurement feedback (CQI, PMI and RI).

In PUCCH format 2/2a/2b, modulation by a CAZAC sequence may be supported and a QPSK modulated symbol may be multiplied by a CAZAC sequence having a length of 12. The CS of the sequence may be changed between a symbol and a slot. Orthogonal covering may be used with respect to an RS.

Figure 14:
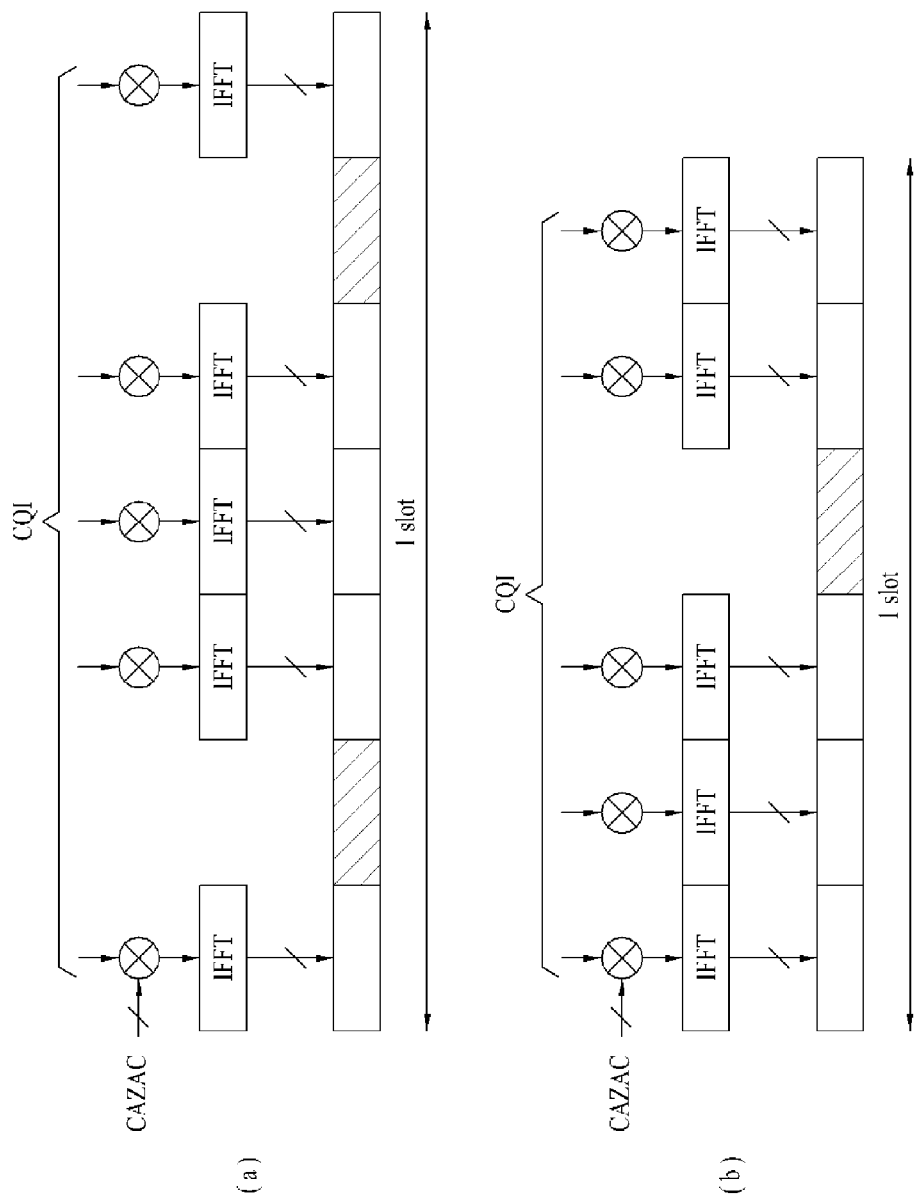
FIG. 14 is a diagram showing the channel structure of a Channel Quality Indicator (CQI) information bit.

FIG. 14 is a diagram showing a-channel structure of a CQI information bit. The CQI information bit may include one or more fields. For example, the CQI information bit may include a CQI field indicating a CQI index for deciding a modulation and coding scheme (MCS), a PMI field indicating an index of a precoding matrix on a codebook, an RI field indicating rank, etc.

Referring to FIG. 14(a), an RS is carried in two SC-FDMA symbols separated by three SC-FDMA symbols among seven SC-FDMA symbols and CQI information may be carried in the remaining five SC-FDMA symbols. Two RSs are used in one slot, in order to support a high-speed UE. UEs may be distinguished using a sequence. CQI information symbols are modulated with all SC-FDMA symbols to be delivered and the SC-FDMA symbols are configured as one sequence. That is, a UE may modulate and transmit a CQI as each sequence.

The number of symbols which may be transmitted in one TTI is 10 and modulation of CQI information is decided up to a QPSK-scheme. If QPSK mapping is used with respect to SC-FDMA symbols, since a CQI value of 2 bits may be carried, a CQI value of 10 bits may be carried in one slot. Accordingly, a CQI value of a maximum of 20 bits may be carried in one subframe. In order to spread CQI information in a frequency domain, a frequency domain spreading code may be used.

A CAZAC sequence (e.g., a ZC sequence) may be used as a frequency domain spreading code. In addition, another sequence having an excellent correlation property may be used as a frequency domain spreading code. In particular, control channels may be distinguished using CAZAC sequences having different CS values. IFFT is performed with respect to the CQI information subjected to frequency domain spreading.

FIG. 14(b) shows an example of transmission of PUCCH format 2/2a/2b in the case of the extended CP. One slot includes six SC-FDMA symbols. Among six OFDM symbols of each slot, an RS may be carried in one OFDM symbol and a CQI information bit may be carried in the remaining five OFDM symbols. The other parts are equal to those of the normal CP of FIG. 14(a).

Orthogonal covering used for the RS in FIGS. 14(a) and 14(b) is shown in Table 2.

TABLE 2

| Normal CP | Extended CP |
|---|---|
| [1 1] | [1] |

Figure 15:
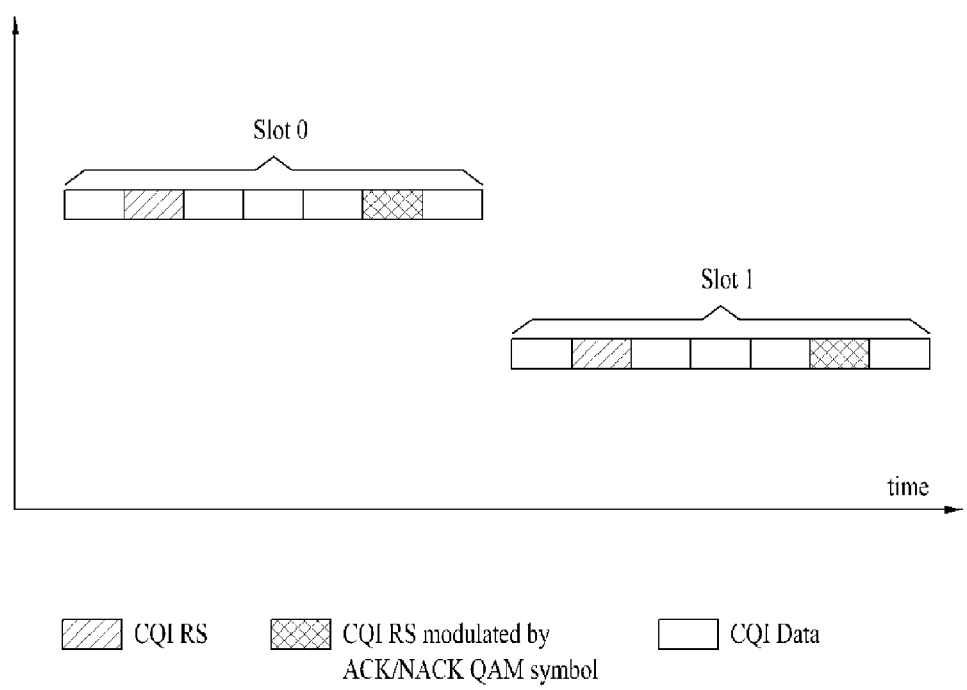
FIG. 15 is a diagram illustrating transmission of CQI and ACK/NACK information.

Simultaneous transmission of CQI information and ACK/NACK information will be described with reference to FIG. 15.

In the case of the normal CP, CQI information and ACK/NACK information may be simultaneously transmitted using PUCCH format 2a/2b. ACK/NACK information may be transmitted through a symbol in which a CQI RS is transmitted. That is, in the case of the normal CP, a second RS may be modulated with an ACK/NACK symbol. If an ACK/NACK symbol is modulated using a BPSK scheme as in PUCCH format 1a, a CQI RS may be modulated with an ACK/NACK symbol using a BPSK scheme and, if an ACK/NACK symbol is modulated using a QPSK scheme as in PUCCH format 1b, a CQI RS may be modulated with an ACK/NACK symbol using a QPSK scheme. In the case of the extended CP, CQI information and ACK/NACK information may be simultaneously transmitted using PUCCH format 2 and the CQI information and the ACK/NACK information may be joint-coded.

In addition to the above description, for the description of the PUCCH, refer to the 3GPP standard document (e.g., 3GPP TS 36.211 Chapter 5.4) and the detailed description of the PUCCH will be omitted for clarity. However, the PUCCH described in the above standard document is applicable to the PUCCH used in the following various embodiments of the present invention.

Channel Status Information Feedback

In order to accurately perform a MIMO scheme, a receiving end may feed an RI, a PMI and a CQI back to a transmitting end. The RI, the PMI and the CQI are collectively referred to as channel status information (CSI). Alternatively, the term "CQI" may be used as channel information including the RI, the PMI and the CQI.

Figure 16:
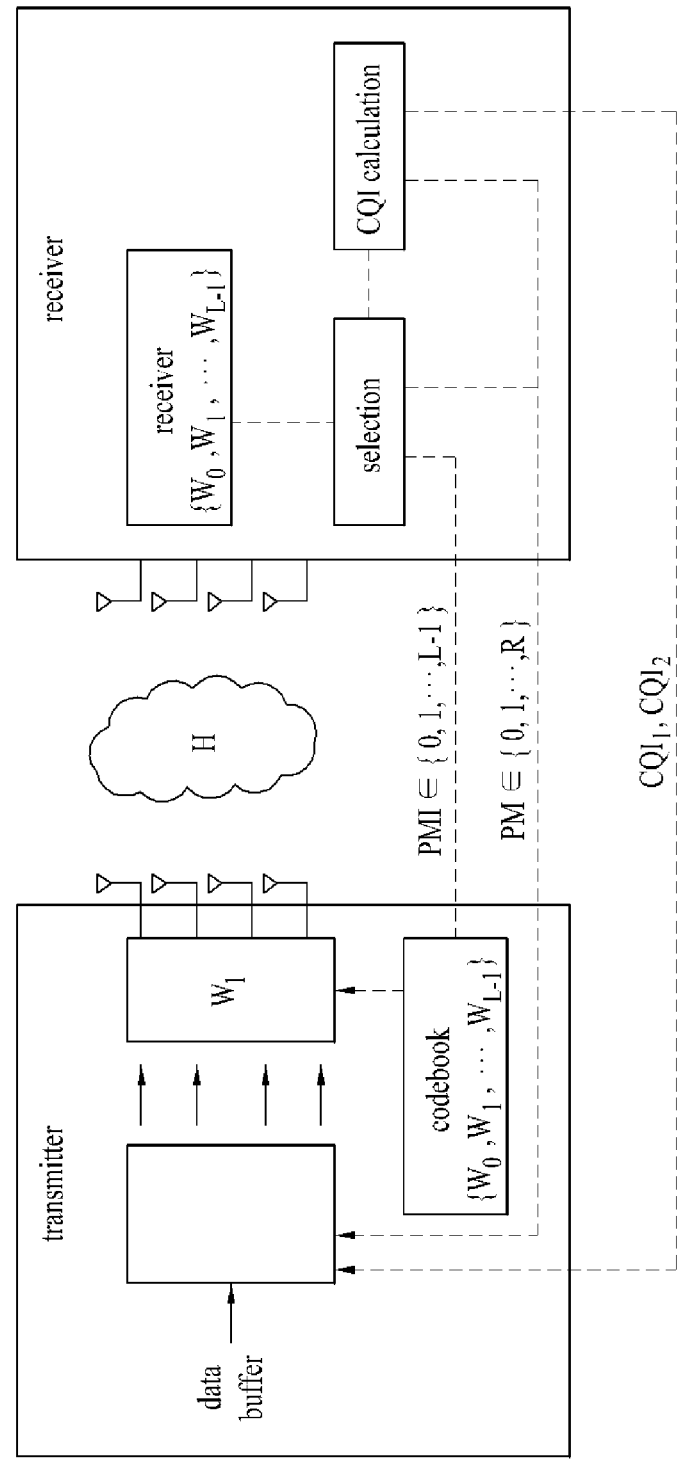
FIG. 16 is a diagram illustrating feedback of channel status information.

FIG. 16 is a diagram illustrating feedback of channel status information.

Referring to FIG. 16, MIMO transmission of a transmitter may be received by a receiver through a channel H. The receiver may select a preferred precoding matrix from a codebook based on the received signal and feed the selected PMI to the transmitter. In addition, the receiver may measure a signal-to-interference plus noise ratio (SINR) of the received signal and calculate and feed channel quality information (CQI) back to the transmitter. The receiver may feed an RI of the received signal back to the transmitter. The transmitter may decide the number of layers suitable for data transmission to the receiver, time/frequency resources, an MCS, etc. using the RI and CQI information fed back from the receiver. In addition, the transmitter may transmit a transmitted signal subjected to precoding using a precoding matrix $W_1$ indicated by the PMI fed back from the receiver through a plurality of antennas.

Hereinafter, channel status information will be described in detail.

The RI is information about channel rank (the number of layers used for transmission from the transmitter). The RI is determined by the number of allocated transmission layers and may be acquired from downlink control information (DCI) associated therewith.

The PMI is information about a precoding matrix used for transmission from the transmitter. The precoding matrix fed back from the receiver is determined in consideration of the number of layers indicated by the RI. The PMI may be fed back in the case of closed-loop spatial multiplexing (SM) and large delay CDD transmission. In the case of open-loop transmission, the transmitter may select a precoding matrix according to a predetermined rule. A process of, at a receiver, selecting a PMI with respect to each rank will now be described. The receiver calculates an SINR previously processed with respect to each PMI, converts the calculated SINR into a sum capacity, and select a best PMI based on the sum capacity. That is, a process of calculating the PMI at the receiver is a process of searching for a best PMI based on the sum capacity. The transmitter which receives the PMI fed back from the receiver may use the precoding matrix recommended by the receiver without change and may include information indicating that the precoding matrix is used without change in data transmission scheduling information to be transmitted to the receiver as a 1-bit indicator. Alternatively, the transmitter may not use the precoding matrix indicated by the PMI fed back from the receiver without change. In this case, the transmitter may explicitly include the precoding matrix information used for data transmission to the receiver in scheduling allocation information. For detailed description of the PMI, refer to the 3GPP standard document (e.g., the 3GPP TS36.211).

The CQI is information indicating channel quality. The CIS may be represented by a predetermined MCS combination. The CQI index may be given as shown in Table 3.

TABLE 3

| CQI Index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

As shown in Table 3, the CQI index is represented by four bits (that is, CQI indexes 0 to 15) and each CQI index represent a modulation scheme and a code rate.

A CQI calculation method will now be described. In the 3GPP standard document (e.g., the 3GPP TS36.213), the following assumptions may be considered when the UE calculates the CQI index.

(1) The first three OFDM symbols of one subframe are reserved for control signaling.

(2) There is no RE used by a primary synchronization signal, a secondary synchronization signal or a physical broadcast channel (PBCH).

(3) CP length of a non-MBSFN subframe.

(4) A redundancy version is 0.

(5) A PDSCH transmission scheme is a transmission mode (which may be a default mode) currently set with respect to the UE.

(6) A ratio of a PDSCH energy per resource element (EPRE) to a cell-specific RS EPRE may be given with an exception $\rho_A$. ($\rho_A$ may be set on the following assumptions. If a UE is set to transmission mode 2 having four cell-specific antenna ports or is set to transmission mode 3 having four cell-specific antenna ports and an RI of 1 with respect to an arbitrary modulation scheme, $\rho_A = P_A + \Delta_{offset} + 10 \log_{10}(2)$ [dB]. In the other case, with respect to an arbitrary modulation scheme and an arbitrary number of layers, $\rho_A = P_A + \Delta_{offset}$ [dB]. $\Delta_{offset}$ is given by a nomPDSCH-RS-EPRE-Offset parameter set by higher layer signaling.).

Such assumptions mean that the CQI includes not only channel quality information but also a variety of information about a UE. That is, since different CQI indexes may be fed back according to capacity of the UE even given the same channel quality, a predetermined criterion is defined.

The UE may receive a downlink RS from the BS and check the channel status through the received RS. The RS may be a common reference signal (CRS) defined in the existing 3GPP LTE system or a channel status information-reference signal (CSI-RS) defined in a system having an extended antenna configuration (e.g., a 3GPP LTE-A system). The UE may calculate a CQI index in which a BLER does not exceed 10% while satisfying the assumption given for CQI calculation in the channel checked through the RS. The UE may transmit the calculated CQI index to the BS. The UE does not apply a method of improving interference estimation when calculating the CQI index.

The process of checking the channel status and obtaining a suitable MCS at the UE may be designed using various methods in terms of UE implementation. For example, the UE may calculate a channel status or a valid SINR using the RS. In addition, the channel status or the valid SINR may be measured over the whole system bandwidth (which may be referred to as a set S) or a partial bandwidth (a specific subband or a specific RB). A CQI of the whole system bandwidth (set S) may be referred to as a wideband (WB) CQI and a CQI of a partial bandwidth may be referred to as a subband (SB) CQI. The UE may obtain a highest MCS based on the calculated channel status or valid SINR. The highest MCS means an MCS which satisfies the assumption associated with CQI calculation while the BLER exceeds 10% upon decoding. The UE may determine the CQI index associated with the obtained MCS and report the determined CQI index to the BS.

The UE may transmit only the CQI (CQI-only transmission). In this case, the CQI is aperiodically transmitted without data on the PUSCH. Aperiodic CQI transmission may be performed using an event triggered method according to a request from the BS. The request from the BS may be a CQI request defined by 1 bit in DCI format 0. For CQI-only transmission, in Table 4, an MCS index $I_{MCS}$ of 29 may be signaled. In this case, a CQI request bit of DCI format 0 is set to 1, transmission of 4 or fewer RBs is set, redundancy version 1 (RV1) in PUSCH data retransmission is indicated, and a modulation order $Q_m$ may be set to 2. That is, only a QPSK scheme may be used as a modulation scheme in CQI-only transmission.

TABLE 4

| MCS Index $I_{MCS}$ | Modulation Order $Q_m'$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |

TABLE 4-continued

| MCS Index $I_{MCS}$ | Modulation Order $Q_m{'}$ | TBS Index $I_{TBS}$ | Redundancy Version $rv_{idx}$ |
|---|---|---|---|
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

Hereinafter, an operation for reporting channel quality information will be described in detail.

In the 3GPP LTE system, when a downlink receiver (e.g., a UE) is connected to a downlink transmitter (e.g., a BS), reference signal received power (RSRP), reference signal received quality (RSRQ), etc. of an RS transmitted in downlink may be measured at any time and the measured result may be reported to the BS periodically or using an event triggered method.

In a cellular OFDM radio packet communication system, each UE reports downlink channel information according to a downlink channel status in uplink and a BS may determine time/frequency resources and MCS suitable for data transmission of each UE using the downlink channel information received from each UE.

In the existing 3GPP LTE system (e.g., the 3GPP LTE release-8 system), such channel information may include a CQI, a PMI and an RI and all or part of the CQI, the PMI and the RI may be transmitted according to the transmission mode of each UE. The CQI is determined by received signal quality of a UE and may be generally determined based on measurement of a downlink RS. At this time, the CQI value actually sent to the BS corresponds to an MCS having maximum capacity while the BLER is maintained at 10% or less in the received signal quality measured by the UE.

The method of reporting channel information is divided into a periodic reporting method for periodically transmitting channel information and an aperiodic reporting method of transmitting channel information according to a request of a BS.

In aperiodic reporting, information indicated by a 1-bit request bit (CQI request bit) included in uplink scheduling information transmitted from the BS to the UE is signaled to the UE. Each UE receives this information and delivers channel information considering a transmission mode thereof to the BS through a PUSCH. The RI and the CQI/PMI may be set not to be transmitted on the same PUSCH.

In the periodic reporting, a channel information transmission period and period offset may be signaled to each UE in subframe units through a higher layer signal and channel information considering the transmission mode of each UE may be sent to the BS through a PUCCH according to the determined period. If data transmitted in uplink is present in a subframe in which channel information is transmitted according to the determined period, the channel information may be transmitted via the PUSCH along with data, not via the PUCCH. In the periodic reporting method via the PUCCH, restricted bits may be used as compared to the PUSCH. The RI and the CQI/PMI may be transmitted on the same PUSCH.

If periodic reporting and aperiodic reporting collide with each other in the same subframe, only aperiodic reporting may be performed.

In calculation of the WB CQI/PMI, a recently transmitted RI may be used. The RI in the PUCCH reporting mode is independent of the RI in the PUSCH reporting mode and the RI in the PUSCH reporting mode is valid only with respect to the CQI/PMI in the PUSCH reporting mode.

The CQI/PMI/RI feedback type for the PUCCH reporting mode may be divided into four types. Type 1 is CQI feedback for a subband selected by the UE. Type 2 is WB CQI feedback and WB PMI feedback. Type 3 is RI feedback. Type 4 is WB CQI feedback.

Referring to FIG. 5, the periodic reporting of the channel information may be divided into four reporting modes of Mode 1-0, 1-1, 2-0 and 2-1 according to the CQI and PMI feedback type.

TABLE 5

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
| | UE Selected | Mode 2-0<br>RI (only for Open-Loop SM)<br>Wideband CQI (4 bit)<br>Best-1 CQI (4 bit) in each BP<br>Best-1 indicator(L-bit label)<br>when RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

A CQI feedback type is divided into a WB CQI and an SB CQI and a PMI feedback type is divided into No PMI and a single PMI depending on whether a PMI is transmitted. In Table 5, No PMI corresponds to open-loop (OL), transmit diversity (TD) and single-antenna and the single PMI corresponds to closed-loop (CL).

In Mode 1-0, a PMI is not transmitted and a WB CQI is transmitted. In this case, the RI is transmitted only in OL spatial multiplexing (SM) and one WB CQI represented by four bits may be transmitted. If the RI exceeds 1, a CQI for a first codeword may be transmitted. In mode 1-0, the feedback type 3 and feedback type 4 are multiplexed and transmitted at different timings within the set reporting period (this may be referred to as channel information transmission of a time division multiplexing (TDM) method).

In Mode 1-1, a single PMI and a WB CQI are transmitted. In this case, a 4-bit WB CQI and a 4-bit WB PMI may be transmitted while the RI is transmitted. Additionally, if the RI exceeds 1, a 3-bit WB spatial differential CQI may be transmitted. In transmission of 2 codewords, the WB spatial differential CQI may represent a difference between a WB CQI index of codeword 1 and a WB CQI index of codeword 2. This difference has one value of a set {−4, −3, −2, −1, 0, 1, 2, 3} and may be represented by 3 bits. In Mode 1-1, feedback type 2 and feedback type 3 may be multiplexed and transmitted at different timings within the set reporting period.

In mode 2-0, a PMI is not transmitted and a CQI of a UE-selected band is transmitted. In this case, the RI may be transmitted only in OL SM and a WB CQI represented by 4 bits may be transmitted. A best (best-1) CQI may be transmitted in each bandwidth part (BP) and the best-1 CQI may be represented by 4 bits. An L-bit indicator indicating best-1 may be transmitted together. If the RI exceeds 1, a CQI for a first codeword may be transmitted. In mode 2-0, feedback 1, feedback type 2, feedback type 3 and feedback type 4 may be multiplexed and transmitted at different timings within the set reporting period.

In Mode 2-1, a single PMI and a WB CQI selected by the UE are transmitted. In this case, a 4-bit WB CQI, a 3-bit WB spatial differential CQI and a 4-bit WB PMI may be transmitted while the RI is transmitted. Additionally, a 0-bit best-1 CQI may be transmitted in each BP and an L-bit best-1 indicator may be transmitted. Additionally, if the RI exceeds 1, a 3-bit WB spatial differential CQI may be transmitted. In transmission of 2 codewords, a difference between a best-1 CQI index of codeword 1 and a best-1 CQI index of codeword 2 may be represented. In Mode 2-1, feedback type 1, feedback type 2 and feedback type 3 may be multiplexed within the set reporting period at different timings to be transmitted.

In the UE-selected SB CQI reporting mode, the size of the subband of the BP may be defined as shown in Table 6.

TABLE 6

| System Bandwidth $N_{RB}^{DL}$ | Subband Size k (RBs) | Bandwidth Parts (J) |
| --- | --- | --- |
| 6-7 | NA | NA |
| 8-10 | 4 | 1 |
| 11-26 | 4 | 2 |
| 27-63 | 6 | 3 |
| 64-110 | 8 | 4 |

In Table 6, the BP and the size of the subband in each BP according to the size of the system bandwidth are shown. The UE may select a preferred subband in each BP and calculate the CQI of the subband.

Figure 17:
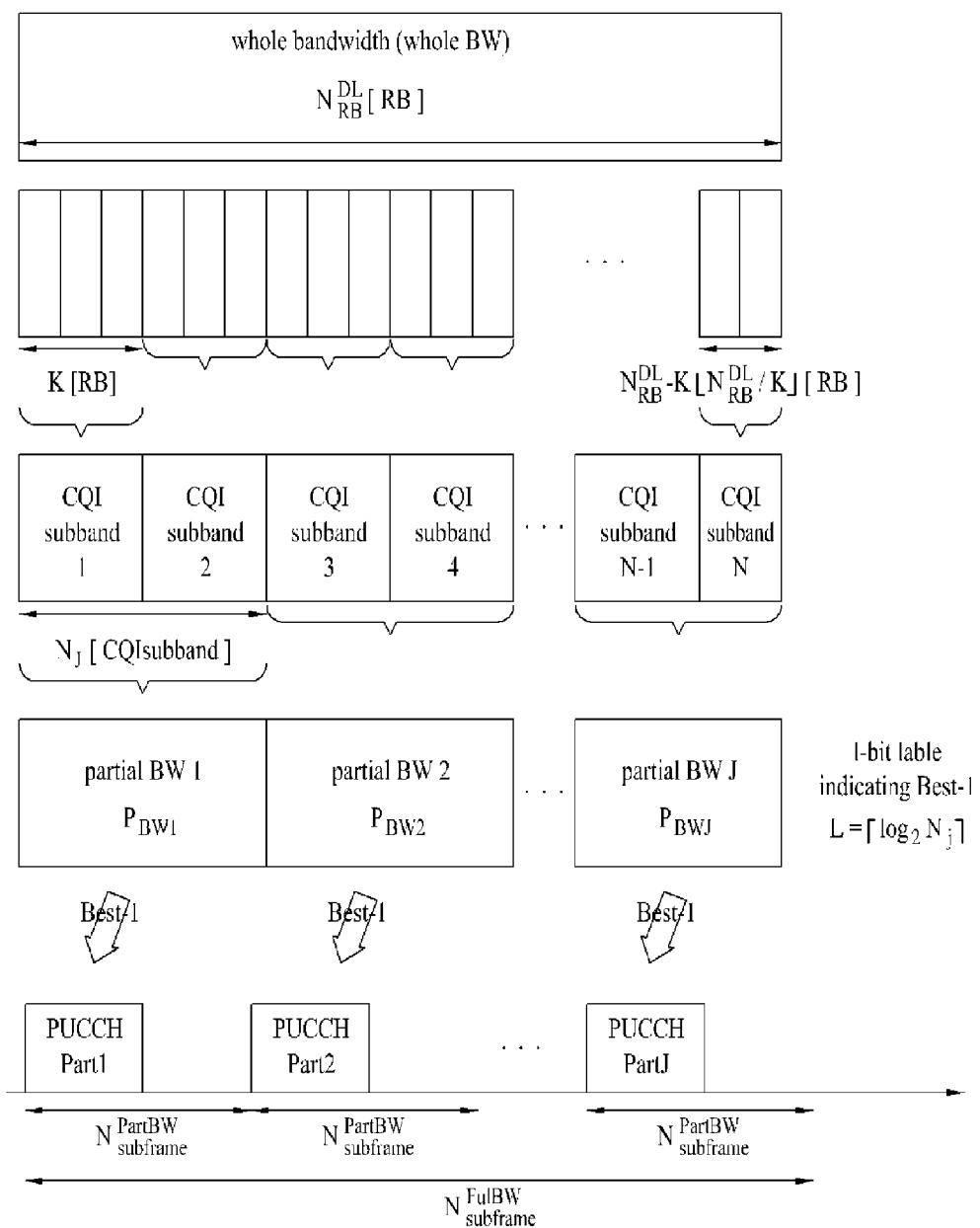
FIG. 17 is a diagram illustrating an example of a CQI reporting mode.

FIG. 17 is a diagram illustrating an example of a UE-selected CQI reporting mode.

$N_{RB}^{DL}$ denotes the number of RBs of the whole bandwidth. The whole bandwidth may be divided into N (1, 2, 3, ..., N) CQI subbands. One CQI subband may include k RBs defined in Table 6. If the number of RBs of the whole bandwidth is not a multiple, the number of RBs configuring a last (N-th) CQI subband may be determined by Equation 14.

$$N_{RB}^{DL} - k \cdot \lfloor N_{RB}^{DL}/k \rfloor \qquad \text{Equation 14}$$

In Equation 14, ⌊ ⌋ denotes a floor operation and ⌊x⌋ or floor(x) denotes a maximum integer which does not exceed x.

In addition, $N_J$ CQI subbands configure one BP and the whole bandwidth may be divided into J BPs. The UE may calculate a CQI index for a preferred best-1 CQI subband in one BP and transmit the CQI index via the PUCCH. At this time, a best-1 indicator indicating which best-1 CQI subband is selected in one BP may be transmitted together. The best-1 indicator may include L bits and L is expressed by Equation 15.

$$L = \lceil \log_2 N_J \rceil \qquad \text{Equation 15}$$

In Equation 15, ⌈ ⌉ denotes a ceiling operation and ⌈x⌉ or ceiling(x) denotes a minimum integer which is not less than x.

In the UE-selected CQI reporting mode using the above method, a frequency band in which the CQI index is calculated may be determined. Hereinafter, a CQI transmission period will be described.

Each UE may receive information including a combination of a channel information transmission period and offset from a higher layer through RRC signaling. The UE may transmit channel information to the BS based on information about the received channel information transmission period.

Figure 18:
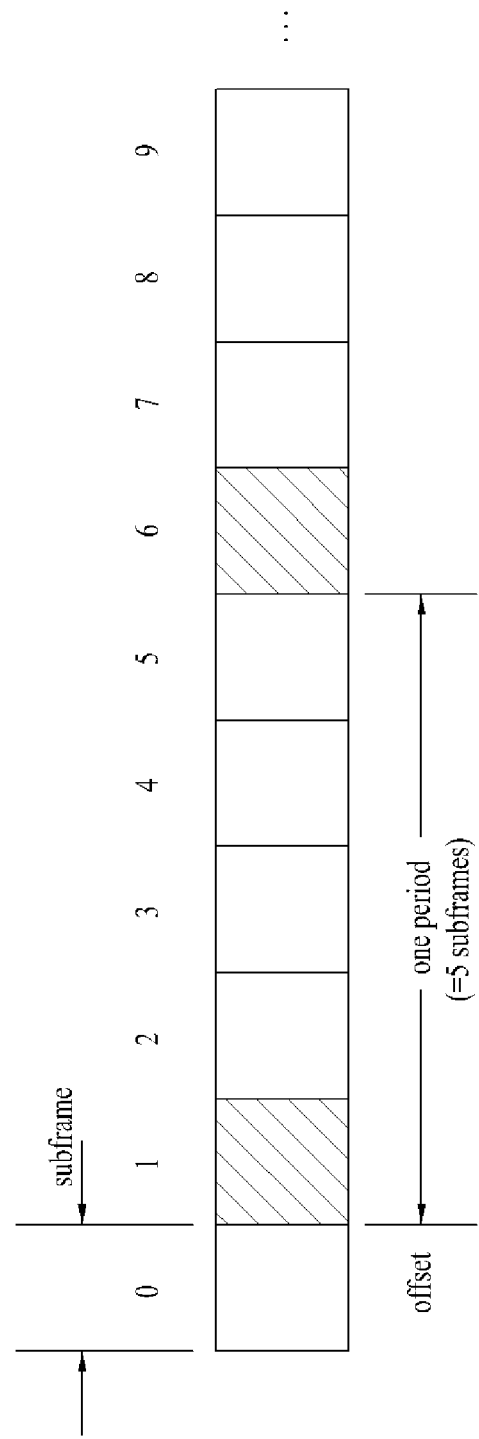
FIG. 18 is a diagram showing an example of a method of periodically transmitting channel information by a user equipment (UE).

FIG. 18 is a diagram showing an example of a method of periodically transmitting channel information by a UE. For example, if the UE receives information including a combination of a channel information transmission period of "5" and an offset of "1", the UE transmits channel information in units of 5 subframes and may transmit channel information via a PUCCH at one subframe offset in a direction in which a subframe index is increased from a $0^{th}$ subframe. At this time, the index of the subframe may be a combination of system frame number $n_f$ and 20 slot indexes $n_s$ of 0 to 19 within the system frame. Since one subframe includes two slots, the subframe index may be represented by $10 \times n_f + \text{floor}(n_s/2)$.

There are a type for transmitting only a WB CQI and a type for transmitting both a WB CQI and an SB CQI according to a CQI feedback type. In the type for transmitting only the WB CQI, WB CQI information for the whole bandwidth is transmitted in a subframe corresponding to every CQI transmission period. The transmission period of the WB periodic CQI feedback may be set to {2, 5, 10, 16, 20, 32, 40, 64, 80, 160} ms or the WB periodic CQI feedback may not be transmitted. At this time, in Table 5, if the PMI is also transmitted according to the PMI feedback type, the PMI information is transmitted along with CQI information. In the type for transmitting the WB CQI and the SB CQI, the WB CQI and the SB CQI may be alternately transmitted.

Figure 19:
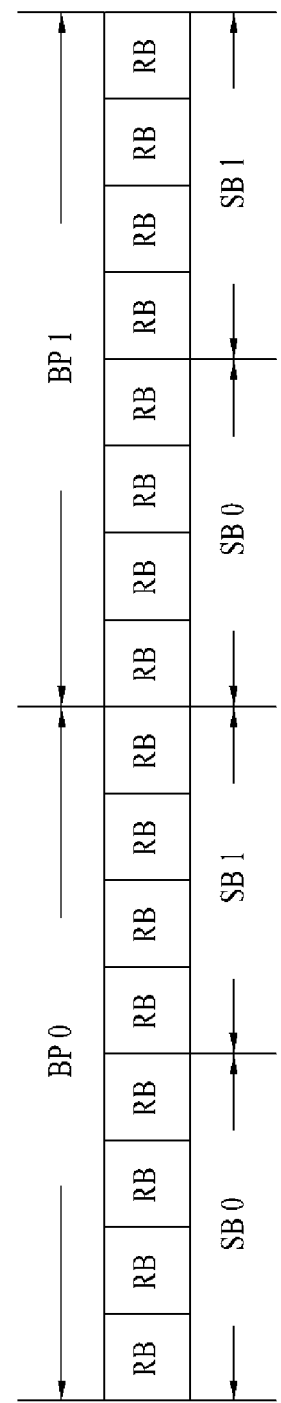
FIG. 19 is a diagram illustrating transmission of an SB CQI.

FIG. 19 is a diagram illustrating an example of a method of transmitting both a WB CQI and an SB CQI. In FIG. 19, for example, a system composed of 16 RBs is shown. A system in which a system frequency bandwidth has 16 RBs may include, for example, two BPs (BP0 and BP1), each BP includes two subbands (SB) (SB0 and SB1), and each SB includes four RBs. At this time, as described with reference to Table 6, the number of BPs and the size of each SB may be determined depending on how many RBs are included in the whole system bandwidth and how many SBs are included in each BP may be determined according to the number of RBs, the number of BPs and the size of the SB.

In the type for transmitting both a WB CQI and an SB CQI, a WB CQI is transmitted in a CQI transmission subframe, an SB (best-1) CQI having a good channel status between SB0 and SB1 in BP0 and the index (that is, a best-1 indicator) of the SB are then transmitted in a next transmission frame, and then an SB (best-1) CQI having a good channel status between SB0 and SB1 in BP1 and the index (that is, a best-1 indicator) of the SB are transmitted in a next transmission subframe. After the WB CQI is transmitted, CQI information of BPs is sequentially transmitted. CQI information of BP may be sequentially transmitted once to four times between the already transmitted WB CQI and the WB CQI to be transmitted. For example, if CQI information of BPs is transmitted between two WB CQIs once, transmission may be performed in order of WB CQI, BP0 CQI, BP1 CQI and WB CQI. As another example, if CQI information of BP is transmitted between two WB CQIs four times, transmission may be performed in order of WB CQI, BP0 CQI, BP1 CQI, BP0 CQI, BP1 CQI, BP0 CQI, BP1 CQI, BP0 CQI, BP1 CQI and WB CQI. Information about how many times CQI information of BP is transmitted between two WB CQIs may be signaled by a higher layer and may be transmitted via a PUCCH in a subframe corresponding to information about a combination of a channel information transmission period and offset signaled by a higher layer shown in FIG. 18.

If a PMI is also transmitted according to PMI feedback type, PMI information is transmitted along with CQI information. If a PUSCH for uplink data transmission is present in the corresponding subframe, the CQI and the PMI may be transmitted along with data through the PUSCH, instead of the PUCCH.

Figure 20:
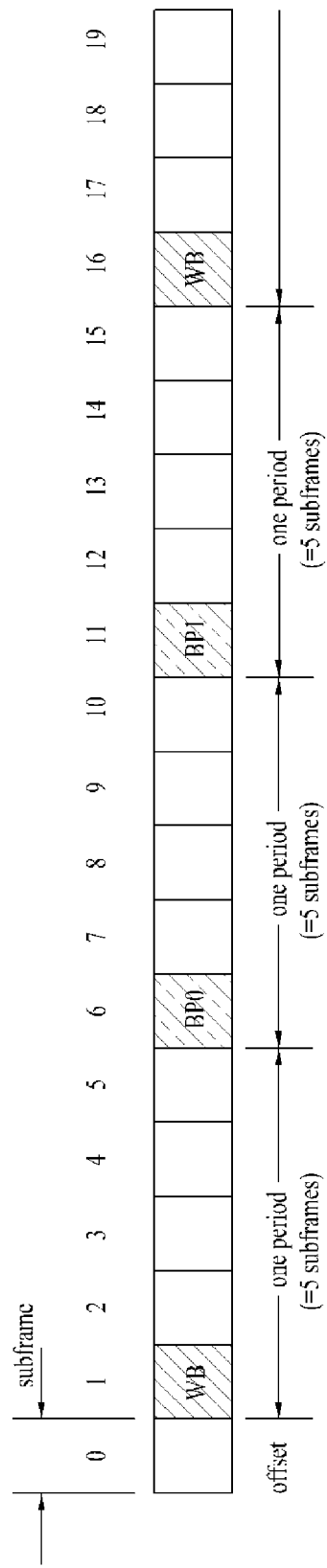
FIG. 20 is a diagram illustrating transmission of both a WB CQI and an SB CQI.

FIG. 20 is a diagram illustrating an example of a CQI transmission method of the case in which both a WB CQI and an SB CQI are transmitted. FIG. 20 shows an example of a channel information transmission operation of a UE when information about a combination of a channel information transmission period of "5" and an offset of "1" is signaled and information about BP is sequentially transmitted once between two WB CQIs/PMIs.

In case of transmitting an RI, information about a combination of how many times as great as a transmission period of a WB CQI/PMI is a transmission period of the RI and an offset of the transmission period may be signaled. The offset is defined as a relative offset of a CQI/PMI transmission offset. For example, if the offset of the transmission period of the CQI/PMI is "1" and the offset of the transmission period of the RI is "0", the offset of the transmission period of the RI is equal to the offset of the transmission period of the CQI/PMI. The offset of the transmission period of the RI may be 0 or a negative value.

Figure 21:
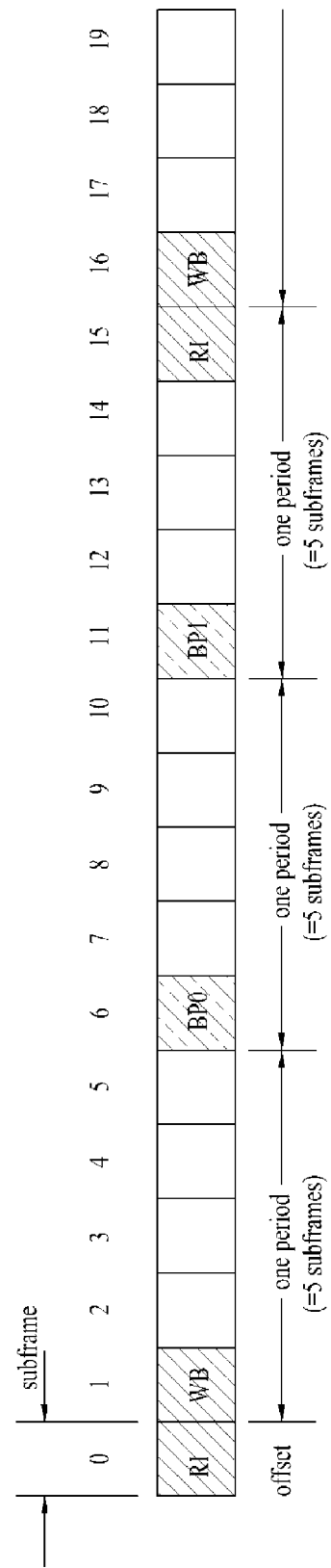
FIG. 21 is a diagram illustrating transmission of a WB CQI, an SB CQI and a Rank Indicator (RI).

FIG. 21 shows the case in which the transmission period of the RI is one time the transmission period of the WB CQI/PMI and the offset of the transmission period of the RI is "−1" when CQI/PMI transmission shown in FIG. 20 is set. Since the transmission period of the RI is one time the transmission period of the WB CQI/PMI, the RI and the WB CQI/PMI have the same period. In addition, since the offset value of the RI of "−1" mean that the RI offset has a value of "−1" relative to the CQI offset "1" of FIG. 20, the RI may be transmitted at a subframe index 0.

If RI transmission and WB CQI/PMI or SB CQI/PMI transmission overlap, the WB CQI/PMI or the'SB CQI/PMI may be dropped. For example, if the offset of the RI, is not "−1" but is "0", the transmission subframes of the WB CQI/PMI and the RI overlap. In this case, the WB CQI/PMI may be dropped and the RI may be transmitted.

By such combination, the CQI, the PMI and the RI may be transmitted. Such information may be transmitted by each UE through RRC signaling of a higher layer. The BS may transmit information suitable for each UE in consideration of the channel status of each UE and the UE distribution state.

The payload sizes of the SB CQI, the WB CQI/PMI, the RI and the WB CQI for the PUCCH report type may be set as shown in Table 7.

TABLE 7

| PUCCH | | | PUCCH Reporting Modes | | | |
|---|---|---|---|---|---|---|
| Report Type | Reported | Mode State | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
|  |  | RI > 1 | NA | 7 + L | NA | 4 + L |
| 2 | Wideband CQI/PMI | 2 TX Antennas RI = 1 | 6 | 6 | NA | NA |
|  |  | 4 TX Antennas RI = 1 | 8 | 8 | NA | NA |
|  |  | 2 TX Antennas RI > 1 | 8 | 8 | NA | NA |
|  |  | 4 TX Antennas RI > 1 | 11 | 11 | NA | NA |
| 3 | RI | 2-layer spatial multiplexing | 1 | 1 | 1 | 1 |
|  |  | 4-layer spatial multiplexing | 2 | 2 | 2 | 2 |
| 4 | Wideband CQI | RI = 1 or RI > 1 | NA | NA | 4 | 4 |

Next, aperiodic CQI, PMI and RI transmission using a PUSCH will be described.

In case of aperiodic reporting, the RI and the CQI/PMI may be transmitted on the same PUSCH. In an aperiodic reporting mode, RI reporting is effective only in CQI/PMI reporting in the aperiodic report mode. A CQI-PMI combination supported with respect to all rank values is shown in Table 8.

TABLE 8

| | | PMI Feedback Type | |
|---|---|---|---|
| | | No PMI (OL, TD, single-antenna) | with PMI (CL) |
| PUSCH CQI Feedback Type | Wideband (Wideband CQI) | | Mode 1-2: Multiple PMI RI $1^{st}$ Wideband CQI (4 bit) $2^{nd}$ Wideband CQI (4 bit) if RI > 1 subband PMIs on each subband |
| | UE Selected (Subband CQI) | Mode 2-0 RI (only for Open-Loop SM) Wideband CQI (4 bit) + Best-M CQI (2 bit) Best-M index when RI > 1, CQI of first codeword | Mode 2-2: Multiple PMI RI $1^{st}$ Wideband CQI (4 bit) + Best-M CQI(2 bit) $2^{nd}$ Wideband CQI (4 bit) + Best-M CQI(2 bit) if RI > 1 |

TABLE 8-continued

| | PMI Feedback Type | |
|---|---|---|
| | No PMI (OL, TD, single-antenna) | with PMI (CL) |
| Higher layer-configured (subband CQI) | Mode 3-0<br>RI (only for Open-Loop SM)<br>Wideband CQI (4 bit) + subband CQI (2 bit) when RI > 1, CQI of first codeword | Wideband PMI + Best-M PMI<br>Best-M index<br>Mode 3-1: Single PMI<br>RI<br>$1^{st}$ Wideband CQI (4 bit) + subband CQI (2 bit)<br>$2^{nd}$ Wideband CQI (4 bit) + subband CQI (2 bit) if RI > 1<br>Wideband PMI |

Mode 1-2 of Table 8 is for WB feedback. In mode 1-2, a preferred precoding matrix of each subband may be selected from a codebook subset on assumption of transmission on each subband. The UE may report one WB CQI per codeword and the WB CQI may be calculated on the assumption of transmission on subbands of the whole system bandwidth (set S) and use of a selected precoding matrix corresponding to each subband. The UE may report the selected PMI with respect to each subband. The subband size is given as shown in Table 9.

TABLE 9

| System Bandwidth $N_{RB}^{DL}$ | Subband Size (k) |
|---|---|
| 6-7 | NA |
| 8-10 | 4 |
| 11-26 | 4 |
| 27-63 | 6 |
| 64-110 | 8 |

Mode 3-0 and Mode 3-1 of Table 8 are for subband feedback configured by a higher layer.

In mode 3-0, the UE may report a WB CQI value calculated on the assumption of transmission on the subbands of the whole system bandwidth (set S). The UE may report one subband CQI value with respect to each subband. The subband CQI may be calculated on the assumption of transmission on a corresponding subband. Both the WB CQI and the SB CQI may represent channel quality of codeword 1 even in case of RI>1.

In mode 3-1, a single precoding matrix may be selected from a codebook subset on the assumption of transmission on subbands of the whole system bandwidth (set S). The UE may report one SB CQI value per codeword with respect to each subband. The SB CQI value may be calculated on the assumption that a single precoding matrix is used in all subbands and transmitted on a corresponding subband. The UE may report a WB CQI value per codeword. The WB CQI value may be calculated on the assumption that a single precoding matrix is used in all subbands and transmitted on subbands of the whole system bandwidth (set S). The UE may report the selected single precoding matrix indicator. The SB CQI value of each codeword may be represented as a difference from a WB CQI using a 2-bit subband differential CQI offset. That is, the subband differential CQI offset is defined as a difference between an SB CQI index and a WB CQI index. The subband differential CQI offset value may be one of {−2, 0, +1, +2}. The subband size may be given as shown in Table 9.

Modes 2-0 and 2-2 of Table 8 are for UE-selected subband feedback. Modes 2-0 and 2-2 will be briefly described on the assumption that best-M averages are reported.

In mode 2-0, the UE may select a set of preferred M (best-M) subbands within the whole system bandwidth (set S). The size of one subband is k and the values k and M for the system bandwidth range are shown in Table 10. The UE may report one CQI value on the assumption of transmission on the M selected (best-M) subbands. This CQI value may represent channel quality for codeword 1 even in case of RI>1. The UE may report the WB CQI value calculated on the assumption of transmission of the subbands of the whole system bandwidth (set S). The WB CQI may represent channel quality for codeword 1 even in case of RI>1.

TABLE 10

| System Bandwidth $N_{RB}^{DL}$ | Subband Size k (RBs) | M |
|---|---|---|
| 6-7 | NA | NA |
| 8-10 | 2 | 1 |
| 11-26 | 2 | 3 |
| 27-63 | 3 | 5 |
| 64-110 | 4 | 6 |

In mode 2-2, the UE may select a set of M preferred (best-M) subbands from the subbands of the whole system bandwidth (set S) (the size of one subband is K) and select a preferred single precoding matrix from a codebook subset to be used for transmission on the M selected subbands. The UE may report one CQI value per codeword in consideration of transmission on the M selected subbands and the use of the same single precoding matrix selected with respect to each of the M subbands. The UE may report an indicator of the single precoding matrix selected with respect to the M subbands. In addition, one precoding matrix (a precoding matrix different from the precoding matrices for the M selected subbands) may be selected from a codebook subset on the assumption of transmission on the subbands of the whole system bandwidth (set S). The UE may report the calculated WB CQI per codeword on the assumption of transmission on the subbands of the whole system bandwidth (set S) and the use of the single precoding matrix on all subbands. The UE may report the indicator of one precoding matrix selected with respect to all subbands.

The UE may report the positions of the M selected subbands using a combinatorial index r in all UE-selected subband feedback modes (modes 2-0 and 2-2). r may be defined as shown in Equation 16.

$$r = \sum_{i=0}^{M-1} \binom{N - s_i}{M - i}$$

Equation 16

A set $\{s_i\}_{i=0}^{M-1}$, ($1 \leq s_i \leq N$, $s_i < s_{i+1}$) may include M sorted subband indexes. In Equation 16, $$\binom{x}{y}$$

is an extended binomial coefficient which is $$\binom{x}{y}$$

in case of $x \geq y$ and is 0 in case of $x < y$. Thus, r has a unique label and is $$r \in \left\{0, \cdots, \binom{N}{M} - 1\right\}.$$

In addition, the CQI values of the M selected subbands for each codeword may be represented by a difference relative to the WB CQI. This relative difference may be represented by a 2-bit differential CQI offset level and may have a value of the CQI index of the M selected subbands—the WB CQI index. The differential CQI value may be one of {+1, +2, +3, +4}.

The supported subband size k and the M value may be given as shown in Table 10. As shown in Table 10, the values k and M are given as a system bandwidth function.

The labels indicating the positions of the M selected (best-M) subbands may be represented by L bits and are $$L = \left\lceil \log_2 \binom{N}{M} \right\rceil.$$

Hereinafter, embodiments of the present invention for a channel information feedback method in multi-carrier transmission will be described.

The channel information feedback method proposed by the present invention may be largely divided into four methods: a first method of extending a channel information feedback method used for single-carrier transmission, a second method of increasing the capacity of a channel capable of transmitting channel information (that is, a frequency division multiplexing (FDM) method), a third method of controlling a transmission period of channel information (that is, a time division multiplexing (TDM) method) and a fourth method of controlling the size of a subband used for reporting channel information. Additionally, the present invention proposes a method of setting an RI reporting offset and a method of setting a channel information reporting period.

In feedback of channel information for multi-carrier transmission, a CQI/PMI/RI reporting period and offset may be independently set per carrier (CC or cell). The present invention proposes various methods of configuring channel information feedback for each carrier by defining a relationship between time/frequency resources used for performing channel information feedback for each carrier and a feedback scheme, in setting of the reporting period of the channel information feedback for multi-carrier transmission. In addition, the embodiments of the present invention may be easily applied in case of periodic reporting (that is, feedback through a PUCCH) of channel information for downlink multi-carrier transmission.

Embodiment 1

The present embodiment relates to a method of extending a channel information feedback method used for single-carrier transmission to multi-carrier transmission.

In single-carrier transmission, channel information required during a transmission period promised via an allocated PUCCH may be transmitted and a restricted amount of control information may be transmitted via an allocated uplink control channel during one transmission period. CQI information may be configured in various ways. For example, the CQI information may have four types within a PUCCH. Type 1 is CQI feedback of a UE-selected subband, Type 2 is WB CQI feedback and WB PMI feedback, Type 3 is RI feedback and Type 4 is WB CQI feedback. Various types of information may be reported according to CQI reporting mode (see Table 5). Various types of information may be reported at a specific time (at one time) via a control channel to which one type of information is allocated and CQI information configured in various ways may be multiplexed using a TDM scheme so as to be reported in the promised period.

In multi-carrier transmission, channel information corresponding to each CC (or cell) is measured and reported. Channel information of multiple downlink carriers may be transmitted via an uplink channel using a specific uplink carrier (e.g., a UL PCC or a UL P-cell). Alternatively, channel information of downlink multiple carriers may be transmitted via one or more uplink carriers.

Embodiment 2

The present embodiment relates to a method of utilizing a PUCCH allocated for each CC when reporting channel information of each CC (or each cell). That is, channel information of multiple carriers may be transmitted using multiple control channels at a specific time. For example, when reporting channel information of N downlink carriers, the channel information may be simultaneously transmitted via M (M≤N) PUCCHs. This may be referred to as channel information feedback of an FDM scheme. Since the capacity of a channel capable of transmitting channel information in a state in which an uplink channel capable of transmitting channel information is restricted is increased, it is possible to efficiently transmit channel information.

Alternatively, a method of concatenating channel information transmitted on M (M≤N) PUCCHs, performing channel coding and simultaneously transmitting the channel information may be considered. For example, when an RI is reported, the RI may be transmitted via one PUCCH by concatenating and encoding the RI for N carriers to be transmitted on M (M≤N) PUCCHs.

Embodiment 3

The present embodiment relates to a method of transmitting channel information of multiple carriers at different timings, for example, a method of transmitting channel information of N downlink carriers via M (1≤M≤N) PUCCHs at different timings. Information about each carrier is transmitted using a conventional channel information reporting method (defined in 3GPP LTE release-8). According to this method, if only channel information of one carrier can be transmitted at any time, it is possible to efficiently transmit channel information by setting channel information of respective carriers to be transmitted at different timings. Such a method may be a channel information transmission method of a TDM scheme. The following two methods are proposed with respect to timings when channel information of each carrier is transmitted.

First, a method of sequentially transmitting all channel information of one carrier and then transmitting all channel information of another carrier among N carriers is used. For example, if N is 2, all channel information of carrier A may be transmitted and then all channel information of a carrier B may be transmitted. That is, assuming that channel information of the carrier A includes A1, A2, A3 and A4 and channel information of the carrier B includes B1, B2, B3 and B4, all A1, A2, A3 and A4 may be transmitted and then B1, B2, B3 and B4 may be transmitted in this order.

Second, a method of alternately transmitting some of channel information of one carrier and some of channel information of another carrier among N carriers is used. For example, if N is 2, channel information of a channel A and a channel B may be alternately transmitted. That is, A1, B1, A2, B2, A3, B3, A4 and B4 may be transmitted in this order.

Embodiment 4

The present embodiment relates to a method of differently configuring the size of a subband for measuring channel information in a multi-carrier system.

If a subband CQI among channel information for multi-carrier transmission is transmitted, the size of a subband for measuring a CQI may be extended. For example, if the size of the subband defined in order to report the channel status of a single carrier is defined as shown in Table 9, the subband size in multi-carrier transmission may be defined as a multiple of the subband size defined in single-carrier transmission. That is, channel information may be represented as being measured in units of a plurality of carriers. Thus, since overhead of transmitted channel information is reduced, it is possible to efficiently transmit channel information.

For example, in the case in which a subband size of 4 RBs is defined in a system bandwidth of 5 MHz, an SB CQI may be measured based on a subband size of 2×4 RBs when two bands of 5 MHz are aggregated.

Extension of the subband size may be determined according to the number of monitored carriers. Alternatively, the subband size may be determined according to system bandwidth. For example, the subband size for CQI measurement may be determined on the assumption that the bandwidth after the carriers are aggregated is regarded as a system bandwidth. Alternatively, the subband size may be determined according to the number of concatenated carriers if some carriers are concatenated.

Embodiment 5

The present embodiment relates to a method of setting an offset for RI reporting in a multi-carrier system. In the present embodiment, two methods are proposed.

First, a method of equally applying the same offset for an RI to all carriers is used. When a preferred rank is reported per carrier, RIs for the respective carriers may use the same offset. For example, the RI may be reported with the same period as a CQI reporting period or with a transmission period which is a multiple of the CQI reporting period. A relative timing offset between the RI reporting period and the CQI reporting period may be set such that the RI and the CQI are transmitted at different timings. Such a timing offset may be defined as the same value in respective carriers. Since the RI reporting period offset is relative to the CQI reporting period offset, in the case in which the RI reporting period offsets for the respective carriers are the same, the RI transmission timings for the respective carriers may be differently set when CQI transmission timings for the respective carriers are different.

Second, a method of setting the same RI transmission timings for the respective carriers as the RI reporting timings in a specific carrier (e.g., a specific PCC or P-cell) is used. Thus, the RI may be reported at the same timing with respect to all carriers. When CQI/PMI information is reported after the RI is reported, CQI/PMI information of CCs may be transmitted with different RI reporting offsets on a per CC basis. For example, when RI information of a carrier 1 and a carrier 2 is reported at a first time, CQI information of the carrier 1 may be transmitted with an offset n from the RI transmission timing (first time) and the CQI information of the carrier 2 may be transmitted with an offset m from the RI transmission timing (first time). n and m may be arbitrarily set.

FIG. 22 is a diagram showing an example of setting an RI reporting offset in a multi-carrier system. As described above, an RI reporting offset denotes an offset value relative to CQI reporting timing of a corresponding carrier. In the example of FIG. 22, an RI (RI1) for a carrier 1 and an RI (RI2) for a carrier 2 are transmitted at the same timing (a subframe index 0 of FIG. 22), an RI reporting offset of the carrier 1 has an offset value of one subframe (that is, n=−1), and an RI reporting offset of the carrier 2 has an offset value of two subframes (that is, m=−2). Thus, CQI information (CQI1_1, CQI1_2, CQI1_3 and CQI1_4) of the carrier 1 may be transmitted with an offset of 1 subframe from RI1 and CQI information (CQI2_1, CQI2_2, CQI2_3 and CQI2_4) of the carrier 2 may be transmitted with an offset of 2 subframes from RI.

Embodiment 6

The present embodiment relates to a method of setting a CQI reporting period in a multi-carrier system.

The same CQI reporting period may be set with respect to carriers. The CQI reporting period is indicated through higher layer signaling and a UE may report a CQI according to the indicated period. At this time, the CQI of each carrier may be reported with a constant offset. For example, if a CQI reporting period offset of a carrier 1 (that is, a value for specifying a subframe, in which CQI reporting begins, based on a subframe index 0) is set to n, a CQI reporting period offset of a carrier 2 may be set to an offset k relative to the CQI reporting period offset n for the carrier 1. That is, the CQI reporting periods of carriers are the same, but timings when the CQIs of carriers are transmitted may be differently set.

Alternatively, if a CQI reporting period for a reference carrier (e.g., a PCC or a P-cell) is indicated, the CQI reporting periods for carriers may be set to be equal to the CQI reporting period of the reference carrier. At this time, a CQI reporting offset may be set in order to allocate different CQI transmission timings according to carriers.

Such an offset value may be set based on the CQI reporting time for the reference carrier. Alternatively, the offset value may be directly indicated through higher layer signaling. Alternatively, the offset value may not be separately provided and CQI may be transmitted with different offsets according to carriers based on a predetermined rule.

In order to set the offset for the CQI reporting period, a reference time needs to be set. In the present invention, a first CQI reporting time of a reference carrier (e.g., a PCC or a P-cell) is set as a reference time. For example, if the type of a first transmitted CQI of a certain carrier is WB CQI feedback, a time when the WB CQI is transmitted may be set as a reference time and a CQI for another carrier may be transmitted with an offset from the reference time.

If the CQI reporting period and offset of the reference carrier are provided, the CQI reporting period and offset of each carrier may be set using various methods based on a relationship with the CQI reporting period and the offset of the reference carrier.

For example, it may be assumed that a carrier 1 is set as a reference carrier, a CQI information reporting period of the carrier 1 is p, and a CQI transmission period offset (start point) is n based on a subframe index 0. In addition, it is assumed that a CQI reporting period of a carrier 2 may be equal to the CQI reporting period of the carrier 1 or a CQI transmission period offset of the carrier 2 is k which is an offset from n. Alternatively, the CQI reporting period offset of the carrier 2 may be calculated according to a predetermined rule without separate signaling.

FIG. 23 is a diagram showing an example of setting a CQI reporting period offset in a multi-carrier system. In the example of FIG. 23, the CQI information (CQI1_1, CQI1_2, CQI1_3 and CQI1_4) of the carrier 1 has an offset of 0 (n=0) from the subframe index 0 through higher layer signaling (that is, the start point is the subframe index 0) and the reporting period may be set to 2 subframes. The CQI information (CQ21_1, CQI2_2, CQI2_3 and CQI2_4) of the carrier 2 has an offset of 1 (k=+1) from the CQI reporting period offset of the carrier 1 and the reporting period may be set to 2 subframes, similarly to the CQI of the carrier 1. That is, the CQI reporting period of the carrier 1 and the CQI reporting period of the carrier 2 are the same, but the CQI reporting period offsets of the carrier 1 and the carrier 2 may be differently set. FIG. 23 shows transmission of the CQI information for the carrier 1 and the carrier 2 on the above assumption.

Alternatively, the CQI reporting periods of the respective carriers may be differently set. That is, a certain carrier may use the same CQI reporting period as the CQI reporting period of a reference carrier and another carrier may use a CQI reporting period different from the CQI reporting period of the reference carrier. In this case, the CQI reporting periods of carriers may be given as a difference (offset) relative to the CQI reporting period of the reference carrier. For example, if the CQI reporting period of the carrier 1 is set to p, the CQI reporting period of the carrier 2 may be set to an offset q relative to the CQI reporting period p of the carrier 1.

Embodiment 7

The present embodiment relates to a method of applying different types of CQI modes to respective carriers in a multi-carrier system.

If different CQI modes are set with respect to carriers, different PUCCH resources may be allocated for transmission of the CQIs of carriers. In addition, CQIs of carriers may be transmitted with different timings.

Embodiment 8

The present embodiment relates to a method of transmitting a CQI of one reference carrier and reporting CQIs for the remaining carriers using a difference (that is, a delta value) relative to the CQI of the reference carrier, without transmitting CQIs of carriers in a multi-carrier system.

For example, if a CQI index of a reference carrier is set, the CQIs of the remaining carriers may be measured and reported using the differences relative to the CQI index of the reference carrier. Similarly to the RI and the PMI, RIs and PMs of the remaining carriers may be reported as differences relative to the RI and PMI of the reference carrier.

Although reporting of the channel information of the UE for downlink transmission is described as various channel information feedback methods of the present invention, the present invention is not limited thereto. For example, in a system in which a UE includes multiple antennas and performs uplink MIMO transmission, channel information for uplink MIMO transmission may be fed back to the UE, to which the principle similar to the above-described channel information feedback method is applicable. The principle of the present invention is applicable to channel information feedback for MIMO transmission between a BS and an RN (in backhaul uplink and backhaul downlink) and MIMO transmission between an RN and a UE (in access uplink and access downlink).

Figure 24:
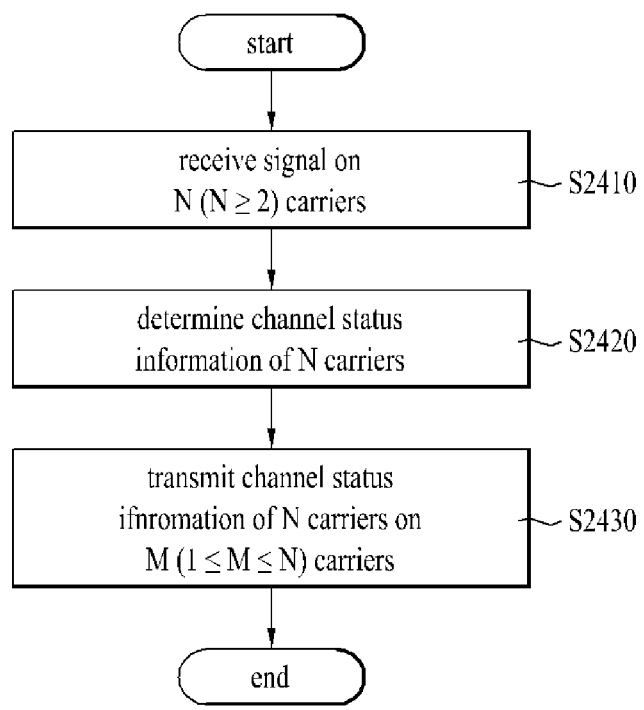
FIG. 24 is a flowchart illustrating a method for transmitting channel status information in a multi-carrier wireless communication system.

FIG. 24 is a flowchart illustrating a method for transmitting channel status information in a multi-carrier wireless communication system.

In step S2410, a receiver (e.g., a UE) may receive a signal on N carriers transmitted from a transmitter (e.g., a BS) to the receiver. Here, N may be a value of 2 or more.

In step S2420, the receiver may determine channel status information of the N carriers from the received signal on the N carriers. The channel status information may include one or more of a CQI, a PMI and an RI. The method of calculating the CQI, the PMI and the RI may be performed according to various embodiments of the present invention.

In step S2430, the receiver may transmit the channel status information of the N carriers on M ($1 \leq M \leq N$) carriers to the transmitter. The channel status information of the N carriers may be transmitted according to the channel status information reporting periods and the channel status information reporting period offsets of the N carriers. The channel status information reporting periods and the channel status information reporting period offsets may be provided through higher layer signaling or determined according to a predetermined rule. In addition, the channel status information may be transmitted through a specific carrier (a PCC or a P-cell).

For example, N carriers may be downlink carriers and M carriers may be uplink carriers. The above-described various embodiments of the present invention are applicable to transmission of the channel status information of the N carriers. For example, the channel status information of the N carriers may be simultaneously transmitted on the M carriers. Here, the channel status information of the N carriers may be transmitted through control channels respectively allocated to the M carriers or the channel status information of the N carriers may be concatenated and encoded and transmitted through one control channel. Alternatively, the channel status information of the N carriers may be transmitted at different timings. Here, the channel status information of the N carriers may be sequentially or alternately transmitted.

If the channel status information includes an SB CQI, the size of the subband in which the CQI is measured may be a multiple of the size of the subband of one carrier among the N carriers. In addition, if the channel status information includes an RI, the RI transmission period offsets of the N carriers may have the same value and the RIs of the N carriers may be transmitted at the same timing. In addition, the channel status information reporting offsets of the N carriers may be set to offsets relative to the channel status information reporting period offset of one reference carrier among the N carriers.

The method of transmitting the channel status information according to the present invention described with reference to FIG. 24 is described as the method to which the various embodiments of the present invention is applied, and the present invention is not limited thereto. That is, in the method described with reference to FIG. 24, the channel status information can be transmitted according to the various methods of the present invention.

Figure 25:
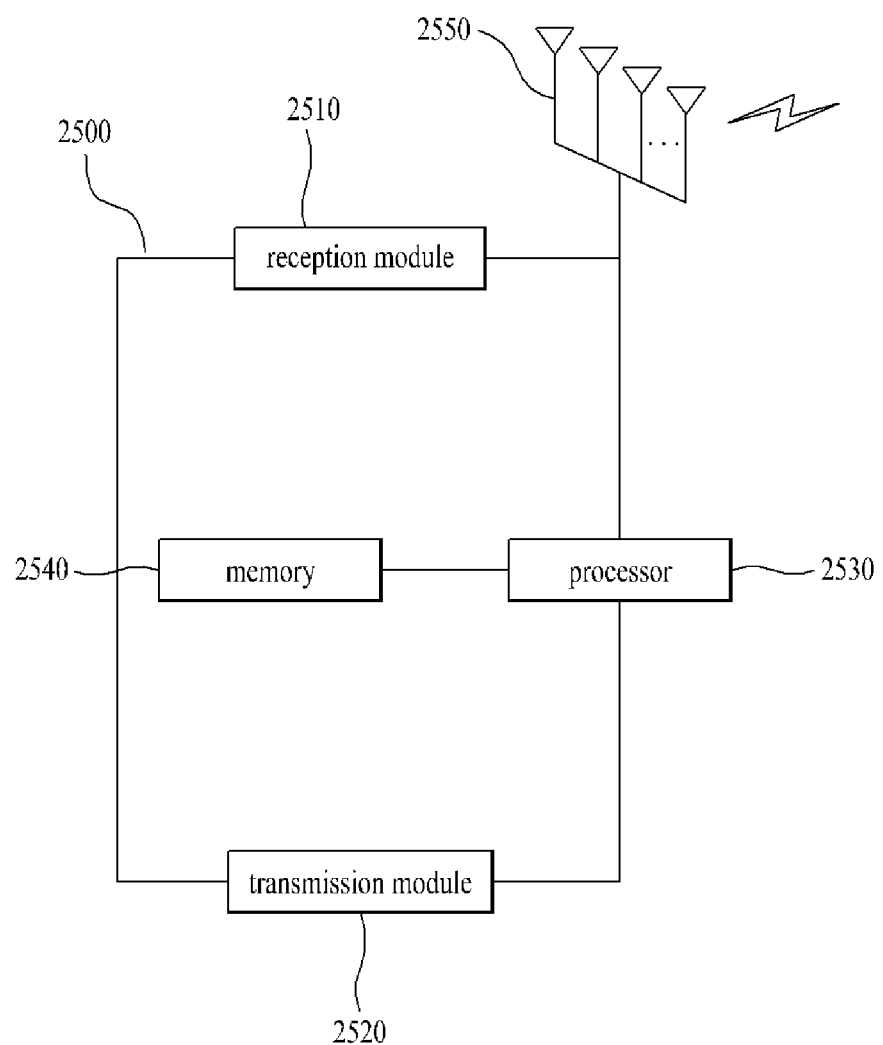
FIG. 25 is a diagram showing the configuration of a preferred embodiment of a base station and a UE.

FIG. 25 is a diagram showing the configuration of a preferred embodiment of a BS and a UE according to the present invention. Although the UE or the BS is described using the same reference numerals, the UE and the BS have the same configuration. That is, the UE and the BS have respective configurations in the following description.

Referring to FIG. 25, the UE 2500 according to the present invention may include a reception module 2510, a transmission module 2520, a processor 2530, a memory 2540 and a plurality of antennas 2550. The use of the plurality of antennas means that the UE supports MIMO transmission. The reception module 2510 may receive a variety of signals, data and information from the BS in downlink. The transmission module 2520 may transmit a variety of signals, data and information to the BS in uplink. The processor 2530 may control the overall operation of the UE 2500.

The UE according to the present invention may be configured to transmit channel status information in a multi-carrier wireless communication system. The processor 2530 of the UE may be configured to receive a downlink signal transmitted on N (N≥2) downlink carriers from the BS through the reception module 2510, determine the channel status information of the N downlink carriers from the received downlink signal, and transmit the channel status information of the N downlink carriers on M (1≤M≤N) uplink carriers to the BS through the transmission module 2520. The channel status information of the N downlink carriers may be transmitted according to the channel status information reporting periods and the channel status information reporting period offsets of the N downlink carriers.

The processor of the UE serves to process information received by the UE and information to be transmitted to an external device. The memory 2540 may store the processed information for a predetermined time and may be replaced with a component such as a buffer (not shown).

Referring to FIG. 25, the BS 2500 according to the present invention may include a reception module 2510, a transmission module 2520, a processor 2530, a memory 2540 and a plurality of antennas 2550. The use of the plurality of antennas means that the BS supports MIMO transmission. The reception module 2510 may receive a variety of signals, data and information from the UE in downlink. The transmission module 2520 may transmit a variety of signals, data and information to the UE in uplink. The processor 2530 may control the overall operation of the BS 2500.

The BS according to the present invention may be configured to receive channel status information in a multi-carrier wireless communication system. The processor 2530 of the BS may be configured to transmit a downlink signal transmitted on N (N≥2) downlink carriers to the UE through the transmission module 2520 and receive the channel status information of the N downlink carriers on M (1≤M≤N) uplink carriers from the UE through the reception module 2510. The channel status information of the N downlink carriers is determined from the signal transmitted on the N downlink carriers received by the UE and the channel status information of the N downlink carriers may be received according to the channel status information reporting periods and the channel status information reporting period offsets of the N downlink carriers.

The processor of the BS serves to process information received by the BS and information to be transmitted to an external device. The memory 2540 may store the processed information for a predetermined time and may be replaced with a component such as a buffer (not shown).

The detailed configuration of the BS or the UE (in particular, the processor) may be implemented by equally applying the various embodiments of the present invention.

In the description of FIG. 25, the description of the BS is equally applicable to an RN as a downlink transmitter and the description of the UE is equally applicable to an RN as a downlink receiver.

The embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

The invention claimed is:

1. A method of periodic transmitting channel status information in a multi-carrier wireless communication system, the method comprising:
receiving, at a receiver, a signal transmitted on N (N≥2) carriers from a transmitter to the receiver;
determining, at the receiver, channel status information of the N carriers based on the received signal; and
transmitting, on M (1≤M≤N) carriers from the receiver to the transmitter, the channel status information of the N carriers,
wherein the channel status information of the N carriers are transmitted according to respective channel status information reporting periods and channel status information reporting period offsets of the N carriers,
wherein the channel status information includes at least one of a channel quality indicator (CQI), a precoding matrix index (PMI) or a rank indicator (RI),
wherein RIs of the N carriers are transmitted at a same timing, and at least one of CQIs or PMIs of the N carriers are transmitted at different timings.

2. The method according to claim 1, wherein the channel status information of the N carriers are simultaneously transmitted on the M carriers.

3. The method according to claim 2, wherein the channel status information of the N carriers are transmitted through control channels respectively allocated to the M carriers.

4. The method according to claim 2, wherein the channel status information of the N carriers are concatenated encoded and transmitted through one control channel.

5. The method according to claim 1, wherein the channel status information of the N carriers are transmitted according to one of transmission at different timings, sequential transmission, or alternate transmission.

6. The method according to claim 1, wherein, if the channel status information includes a subband channel quality indicator (CQI), the size of a subband in which the CQI is measured is a multiple of the size of a subband for one carrier among the N carriers.

7. The method according to claim 1, wherein, if the channel status information includes a rank indicator (RI), RI transmission period offsets of the N carriers have the same value.

8. The method according to claim 1, wherein the respective channel status information reporting period offsets of the N carriers are determined as offset values relative to a channel status information reporting period offset of a predetermined carrier among the N carriers.

9. The method according to claim 1, wherein the respective channel status information reporting periods and the channel status information reporting period offsets of the N carriers are provided through signaling from the transmitter or determined according to a predetermined rule.

10. The method according to claim 1, wherein the channel status information of the N carriers are transmitted through a primary component carrier (PCC) among the M carriers.

11. The method according to claim 1, wherein the channel status information of the N carriers include channel status information of a reference carriers among the N carriers and N−1 delta values for N−1 carriers.

12. A method of receiving channel status information in a multi-carrier wireless communication system, the method comprising:
transmitting a signal on N (N≥2) carriers from a transmitter to a receiver; and
receiving, on M (1≤M≤N) carriers from the receiver to the transmitter, channel status information of the N carriers,
wherein the channel status information of the N carriers is determined based on the signal transmitted on the N carriers at the receiver, and
wherein the channel status information of the N carriers are received according to respective channel status information reporting periods and channel status information reporting period offsets of the N carriers,
wherein the channel status information includes at least one of a channel quality indicator (CQI), a precoding matrix index (PMI) or a rank indicator (RI),
wherein RIs of the N carriers are received at a same timing, and at least one of CQIs or PMIs of the N carriers are received at different timings.

13. A user equipment for transmitting channel status information in a multi-carrier wireless communication system, the user equipment comprising:
a reception module configured to receive a downlink signal from a base station;
a transmission module configured to transmit an uplink signal to the base station; and
a processor configured to control the user equipment including the reception module and the transmission module,
wherein the processor receives a downlink signal transmitted on N (N≥2) downlink carriers from the base station through the reception module, determines channel status information of the N downlink carriers based on the received downlink signal, and transmits, on M (1≤M≤N) uplink carriers, the channel status information of the N downlink carriers through the transmission module, and
wherein the channel status information of the N downlink carriers is transmitted according to respective channel status information reporting periods and channel status information reporting period offsets of the N downlink carriers,
wherein the channel status information includes at least one of a channel quality indicator (CQI), a precoding matrix index (PMI) or a rank indicator (RI),
wherein RIs for the N downlink carriers are transmitted at a same timing, and at least one of CQIs or PMIs for the N downlink carriers are transmitted at different timings.

14. A base station for receiving channel status information in a multi-carrier wireless communication system, the base station comprising:
a reception module configured to receive an uplink signal from a user equipment;
a transmission module configured to transmit a downlink signal to the user equipment; and
a processor configured to control the base station including the reception module and the transmission module,
wherein the processor transmits a downlink signal on N (N≥2) downlink carriers to the user equipment through the transmission module, receives, on M (1≤M≤N) uplink carriers from the user equipment, channel status information of the N downlink carriers through the reception module, wherein the channel status information of the N downlink carriers is determined based on the signal transmitted on the N downlink carriers at the user equipment, and wherein the channel status information of the N downlink carriers are received according to respective channel status information reporting periods and channel status information reporting period offsets of the N downlink carriers, wherein the channel status information includes at least one of a channel quality indicator (CQI), a precoding matrix index (PMI) or a rank indicator (RI), wherein RIs for the N downlink carriers are received at a same timing, and at least one of CQIs or PMIs for the N downlink carriers are received at different timings.

* * * * *